US012563588B2

(12) United States Patent
Hwang et al.

(10) Patent No.: US 12,563,588 B2
(45) Date of Patent: Feb. 24, 2026

(54) METHOD AND DEVICE FOR PERFORMING SL COMMUNICATION AND UL TRANSMISSION ON BASIS OF DIFFERENT RATS

(71) Applicant: LG ELECTRONICS INC., Seoul (KR)

(72) Inventors: Daesung Hwang, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 410 days.

(21) Appl. No.: 18/025,613

(22) PCT Filed: Sep. 6, 2021

(86) PCT No.: PCT/KR2021/011992
§ 371 (c)(1),
(2) Date: Mar. 9, 2023

(87) PCT Pub. No.: WO2022/055191
PCT Pub. Date: Mar. 17, 2022

(65) Prior Publication Data
US 2023/0371061 A1 Nov. 16, 2023

(30) Foreign Application Priority Data

| Sep. 9, 2020 | (KR) | .......................... 10-2020-0115253 |
| Sep. 11, 2020 | (KR) | .......................... 10-2020-0116515 |

(51) Int. Cl.
*H04W 72/12* (2023.01)
*H04W 72/566* (2023.01)
*H04W 52/36* (2009.01)

(52) U.S. Cl.
CPC ..... *H04W 72/569* (2023.01); *H04W 72/1215* (2013.01); *H04W 52/367* (2013.01)

(58) Field of Classification Search
CPC ........... H04W 52/367; H04W 72/1215; H04W 72/569; H04W 72/56; H04W 88/06;
(Continued)

(56) References Cited

U.S. PATENT DOCUMENTS

| 2018/0317123 A1* | 11/2018 | Chen ................. H04W 28/0278 |
| 2020/0236581 A1* | 7/2020 | Zhang ................. H04W 28/082 |

(Continued)

FOREIGN PATENT DOCUMENTS

| KR | 20150128387 | 11/2015 |
| WO | 2020032698 | 2/2020 |

OTHER PUBLICATIONS

ZTE, "Remaining issues on PHY procedures for Rel-16 sidelink," 3GPP TSG-RAN WG1 #100bis-e, R1-2001898, e-Meeting, Apr. 2020, 16 pages.
(Continued)

*Primary Examiner* — Nathan S Taylor
(74) *Attorney, Agent, or Firm* — LEE, HONG, DEGERMAN, KANG & WAIMEY

(57) ABSTRACT

Provided are a method for performing wireless communication by a first device and a device supporting same. The method may comprise the steps of: configuring information on a first sidelink (SL) priority threshold value associated with a first radio access technology (RAT); configuring information on a second SL priority threshold value associated with a second RAT; configuring information on a third SL priority threshold value; and on the basis that uplink (UL) transmission and SL transmission overlap each other in a time domain, performing prioritization for the UL transmission and the SL transmission. For example, on the basis that RATs of the UL transmission and the SL transmission are different, the prioritization for the UL transmission and
(Continued)

receive PT-RS configuration information (from base station or transmitting UE) — S1310 receive PT-RS from transmitting UE based on PT-RS configuration information — S1320 compensate phase for PSSCH based on PT-RS — S1330 the SL transmission may be performed on the basis of the third SL priority threshold value.

18 Claims, 22 Drawing Sheets

(58) Field of Classification Search
CPC ..... H04W 92/10; H04W 92/18; H04W 52/36; H04W 72/12; H04W 72/566; H04W 52/14; H04W 52/34; H04L 5/00
See application file for complete search history.

(56) References Cited

U.S. PATENT DOCUMENTS

| | | | | |
|---|---|---|---|---|
| 2020/0314915 A1* | 10/2020 | Lin | ................... | H04W 74/0833 |
| 2020/0396701 A1* | 12/2020 | Yi | ....................... | H04W 72/569 |
| 2021/0022184 A1* | 1/2021 | Hosseini | .......... | H04W 72/1268 |
| 2021/0029723 A1* | 1/2021 | Wu | ...................... | H04W 72/569 |
| 2021/0105126 A1* | 4/2021 | Yi | ......................... | H04L 1/1671 |
| 2021/0105788 A1* | 4/2021 | Kim | .................... | H04L 41/0869 |
| 2021/0105790 A1* | 4/2021 | Lin | ....................... | H04W 72/56 |
| 2021/0153065 A1* | 5/2021 | Adjakple | ............. | H01M 4/134 |
| 2021/0168832 A1* | 6/2021 | Zhuo | ..................... | H04W 72/23 |
| 2021/0195610 A1* | 6/2021 | Wang | .................. | H04L 1/1854 |
| 2021/0204301 A1* | 7/2021 | Lee | ................... | H04W 72/566 |
| 2021/0212099 A1* | 7/2021 | Yi | ......................... | H04W 72/23 |
| 2021/0258980 A1* | 8/2021 | Luo | ....................... | H04W 76/14 |
| 2021/0274543 A1* | 9/2021 | Ryu | .................... | H04W 72/569 |
| 2021/0329604 A1* | 10/2021 | Chen | ..................... | H04W 72/20 |
| 2021/0345384 A1* | 11/2021 | Zhang | .................. | H04W 72/23 |
| 2021/0377871 A1* | 12/2021 | Zhao | ..................... | H04W 52/12 |
| 2021/0377963 A1* | 12/2021 | Wang | .................. | H04W 52/383 |
| 2022/0006569 A1* | 1/2022 | Lee | ....................... | H04W 72/02 |
| 2022/0007231 A1* | 1/2022 | Basu Mallick | ... | H04W 28/0284 |
| 2022/0015070 A1* | 1/2022 | Chen | ................ | H04W 72/1263 |
| 2022/0029756 A1* | 1/2022 | Sarkis | ................... | H04W 72/20 |
| 2022/0053464 A1* | 2/2022 | Yu | ......................... | H04W 72/02 |
| 2022/0078758 A1* | 3/2022 | Lee | ....................... | H04L 5/0053 |
| 2022/0104179 A1* | 3/2022 | Masini | ............... | H04W 72/542 |
| 2022/0110069 A1* | 4/2022 | Wang | ................. | H04W 52/383 |
| 2022/0141846 A1* | 5/2022 | Lee | ....................... | H04W 72/20 370/329 |
| 2022/0191676 A1* | 6/2022 | Liang | .................... | H04W 8/005 |
| 2022/0225382 A1* | 7/2022 | Yu | ...................... | H04W 28/0278 |
| 2022/0232575 A1* | 7/2022 | Lee | ....................... | H04W 72/56 |
| 2022/0263561 A1* | 8/2022 | Bao | ........................ | H04B 7/063 |
| 2022/0263612 A1* | 8/2022 | Pu | ......................... | H04L 5/0048 |
| 2022/0264478 A1* | 8/2022 | Miao | .................... | H04W 52/242 |
| 2022/0264590 A1* | 8/2022 | Han | ..................... | H04L 1/1854 |
| 2022/0264596 A1* | 8/2022 | Chen | ..................... | H04L 5/0064 |
| 2022/0272721 A1* | 8/2022 | Lee | .................... | H04W 28/0278 |
| 2022/0279527 A1* | 9/2022 | Lee | ........................ | H04W 72/56 |
| 2022/0279537 A1* | 9/2022 | Freda | .................. | H04W 72/569 |
| 2022/0312435 A1* | 9/2022 | Ye | ...................... | H04W 72/1268 |
| 2022/0330265 A1* | 10/2022 | Luo | ........................ | H04W 72/20 |
| 2022/0353815 A1* | 11/2022 | Lin | .................. | H04W 52/0232 |
| 2022/0394702 A1* | 12/2022 | Lee | ........................ | H04L 5/0069 |
| 2023/0056864 A1* | 2/2023 | Luo | ..................... | H04W 72/569 |
| 2023/0057351 A1* | 2/2023 | Ye | ......................... | H04L 5/0051 |
| 2023/0082690 A1* | 3/2023 | Yoshioka | ............ | H04W 52/383 370/329 |
| 2023/0117601 A1* | 4/2023 | Yoshioka | .............. | H04L 5/0055 |
| 2023/0164875 A1* | 5/2023 | Lee | ........................ | H04W 76/23 370/329 |
| 2023/0254819 A1* | 8/2023 | Jeong | .................... | H04W 72/54 370/329 |
| 2023/0276364 A1* | 8/2023 | Basu Mallick | ... | H04W 52/0235 370/311 |
| 2023/0291514 A1* | 9/2023 | Ganesan | .............. | H04W 76/11 |
| 2023/0354407 A1* | 11/2023 | Ganesan | .............. | H04W 72/02 |
| 2023/0362838 A1* | 11/2023 | Yi | ......................... | H04W 72/56 |

OTHER PUBLICATIONS

LG Electronics Inc., "Summary of MAC open issues for NR sidelink," 3GPP TSG-RAN WG2 #109-e, R2-2005725, online, May 2020, 14 pages.

Oppo, "Left issues on MAC running CR," 3GPP TSG-RAN2 Meeting #110, R2-2004406, electronic, May 2020, 9 pages.

3rd Generation Partnership Project (3GPP), "Technical Specification Group Radio Access Network; NR; Multiplexing and channel coding (Release 16)," 3GPP TS 38.212 V16.2.0, Jun. 2020, 151 pages.

3rd Generation Partnership Project (3GPP), "Technical Specification Group Radio Access Network; NR; Physical channels and modulation (Release 16)," 3GPP TS 38.211 V16.2.0, Jun. 2020, 131 pages.

3rd Generation Partnership Project (3GPP), "Technical Specification Group Radio Access Network; NR; Physical layer procedures for control (Release 16)," 3GPP TS 38.213 V16.2.0, Jun. 2020, 176 pages.

3rd Generation Partnership Project (3GPP), "Technical Specification Group Radio Access Network; NR; Physical layer procedures for data (Release 16)," 3GPP TS 38.214 V16.2.0, Jun. 2020, 163 pages.

PCT International Application No. PCT/KR2021/011992, Written Opinion of the International Search Report dated Dec. 15, 2021, 4 pages.

* cited by examiner

FIG. 3

BS(e.g. eNB or gNB)

UE 1　　　　　　　　　　　　　　　　　UE 2

(a)            (b)

(a)          (b)          (c)

● : TX UE
⊘ : RX UE receive PT-RS based on pre-configuration rule
(with base station or transmitting UE) ～S1410 compensate phase for PSSCH based on PT-RS ～S1420

FIG. 20

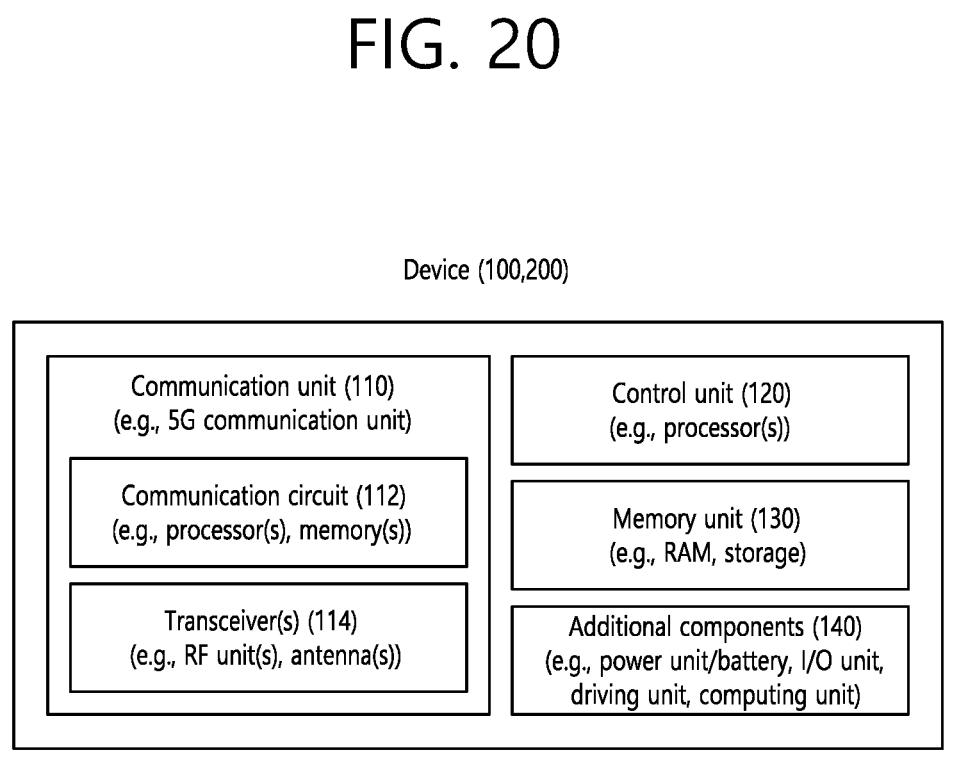

Device (100,200)

| Communication unit (110)<br>(e.g., 5G communication unit) | Control unit (120)<br>(e.g., processor(s)) |
|---|---|
| Communication circuit (112)<br>(e.g., processor(s), memory(s)) | Memory unit (130)<br>(e.g., RAM, storage) |
| Transceiver(s) (114)<br>(e.g., RF unit(s), antenna(s)) | Additional components (140)<br>(e.g., power unit/battery, I/O unit, driving unit, computing unit) |

FIG. 22

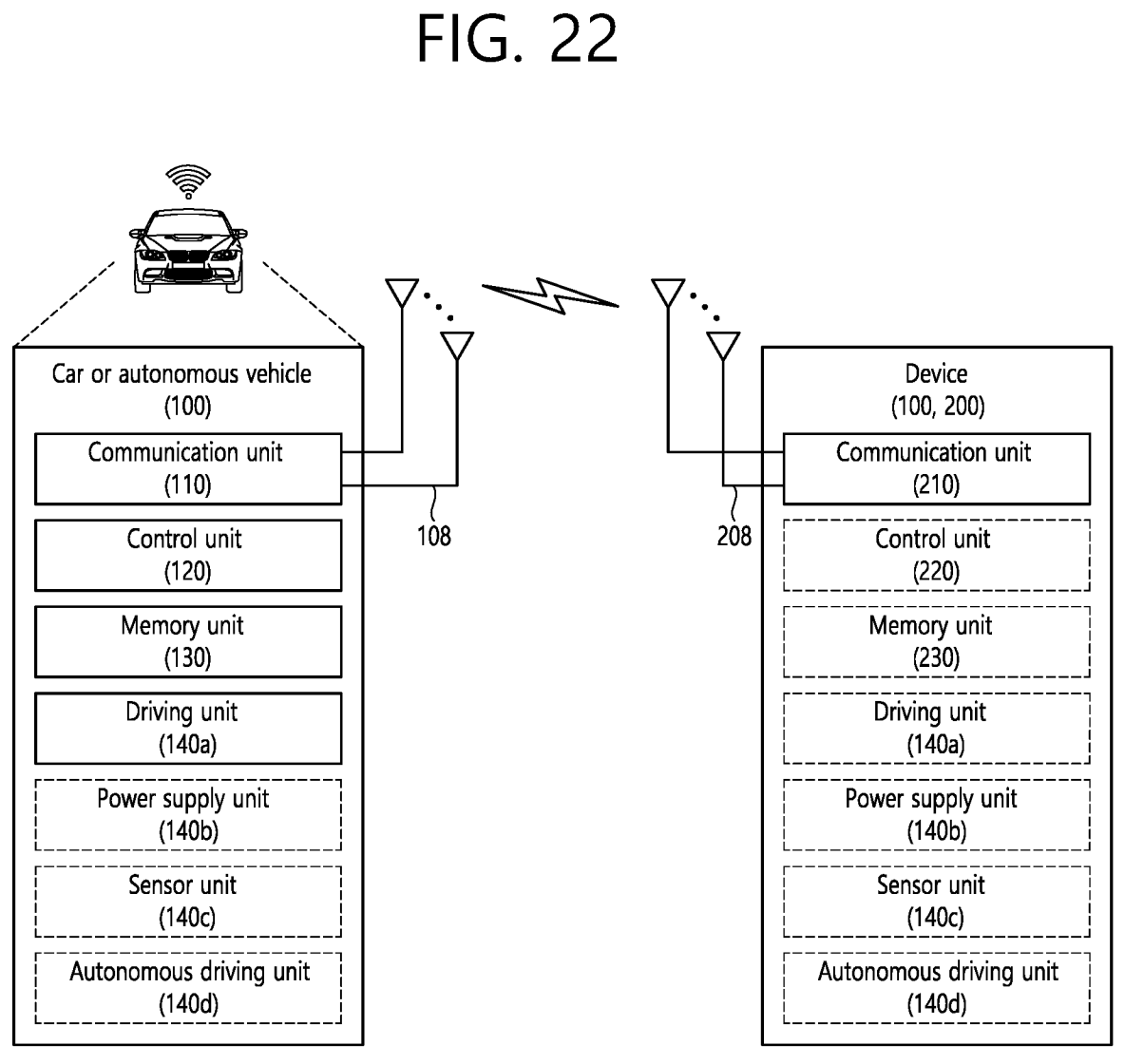

Device (100, 200)
- Communication unit (210)
- Control unit (220)
- Memory unit (230)
- Driving unit (140a)
- Power supply unit (140b)
- Sensor unit (140c)
- Autonomous driving unit (140d)

208

108

Car or autonomous vehicle (100)
- Communication unit (110)
- Control unit (120)
- Memory unit (130)
- Driving unit (140a)
- Power supply unit (140b)
- Sensor unit (140c)
- Autonomous driving unit (140d)

METHOD AND DEVICE FOR PERFORMING SL COMMUNICATION AND UL TRANSMISSION ON BASIS OF DIFFERENT RATS

CROSS-REFERENCE TO RELATED APPLICATION(S)

This application is the National Stage filing under 35 U.S.C. 371 of International Application No. PCT/KR2021/011992, filed on Sep. 6, 2021, which claims the benefit of earlier filing date and right of priority to Korean Application No. 10-2020-0115253, filed on Sep. 9, 2020, and 10-2020-0116515, filed on Sep. 11, 2020, the contents of which are all incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

Thereafter, regarding V2X communication, various V2X scenarios are proposed in NR. For example, the various V2X scenarios may include vehicle platooning, advanced driving, extended sensors, remote driving, or the like.

SUMMARY

Meanwhile, the UE may perform NR-based SL communication while performing LTE-based UL transmission. Meanwhile, the UE may perform LTE-based SL communication while performing NR-based UL transmission. Herein, for example, the LTE-based UL (or SL) communication and the NR-based SL (or UL) communication may be performed in different carriers and/or different serving cells. For example, the LTE-based UL (or SL) communication and the NR-based SL (or UL) communication may be performed in the same carrier and/or the same serving cell. For example, if the LTE-based UL (or SL) communication and the NR-based SL (or UL) communication are performed in different carriers and/or different serving cells, a method for the UE to efficiently control transmit power between SL transmission and UL transmission may be required. For example, if the LTE-based UL (or SL) communication and the NR-based SL (or UL) communication are performed in the same carrier and/or the same serving cell, a criterion for the UE to select one of UL transmission and SL communication may be required.

In one embodiment, provided is a method for performing wireless communication by a first device. The method may comprise: configuring information on a first sidelink (SL) priority threshold related to a first radio access technology (RAT); configuring information on a second SL priority threshold related to a second RAT; configuring information on a third SL priority threshold; and performing, based on overlapping of uplink (UL) transmission and SL transmission in a time domain, prioritization for the UL transmission and the SL transmission, wherein, based on different RATs between the UL transmission and the SL transmission, the prioritization for the UL transmission and the SL transmission is performed based on the third SL priority threshold.

In one embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: configure information on a first sidelink (SL) priority threshold related to a first radio access technology (RAT); configure information on a second SL priority threshold related to a second RAT; configure information on a third SL priority threshold; and perform, based on overlapping of uplink (UL) transmission and SL transmission in a time domain, prioritization for the UL transmission and the SL transmission, wherein, based on different RATs between the UL transmission and the SL transmission, the prioritization for the UL transmission and the SL transmission is performed based on the third SL priority threshold.

Prioritization for Uu communication and SL communication performed in different RATs can be efficiently performed.

BRIEF DESCRIPTION OF THE DRAWINGS

FIG. 3 shows a radio protocol architecture, based on an embodiment of the present disclosure.

FIG. 20 shows another example of a wireless device, based on an embodiment of the present disclosure.

FIG. 22 shows a vehicle or an autonomous vehicle, based on an embodiment of the present disclosure.

DETAILED DESCRIPTION

Figure 1:
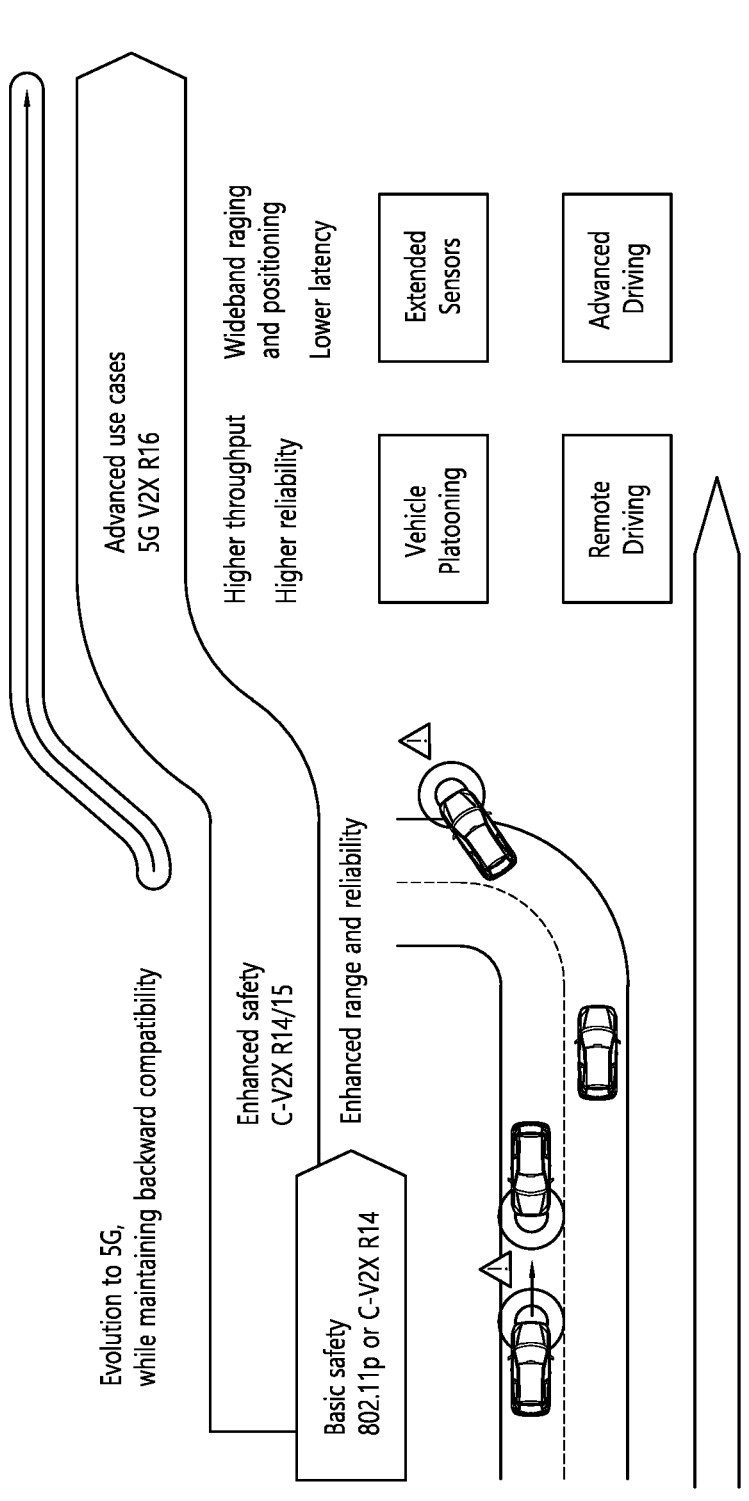
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
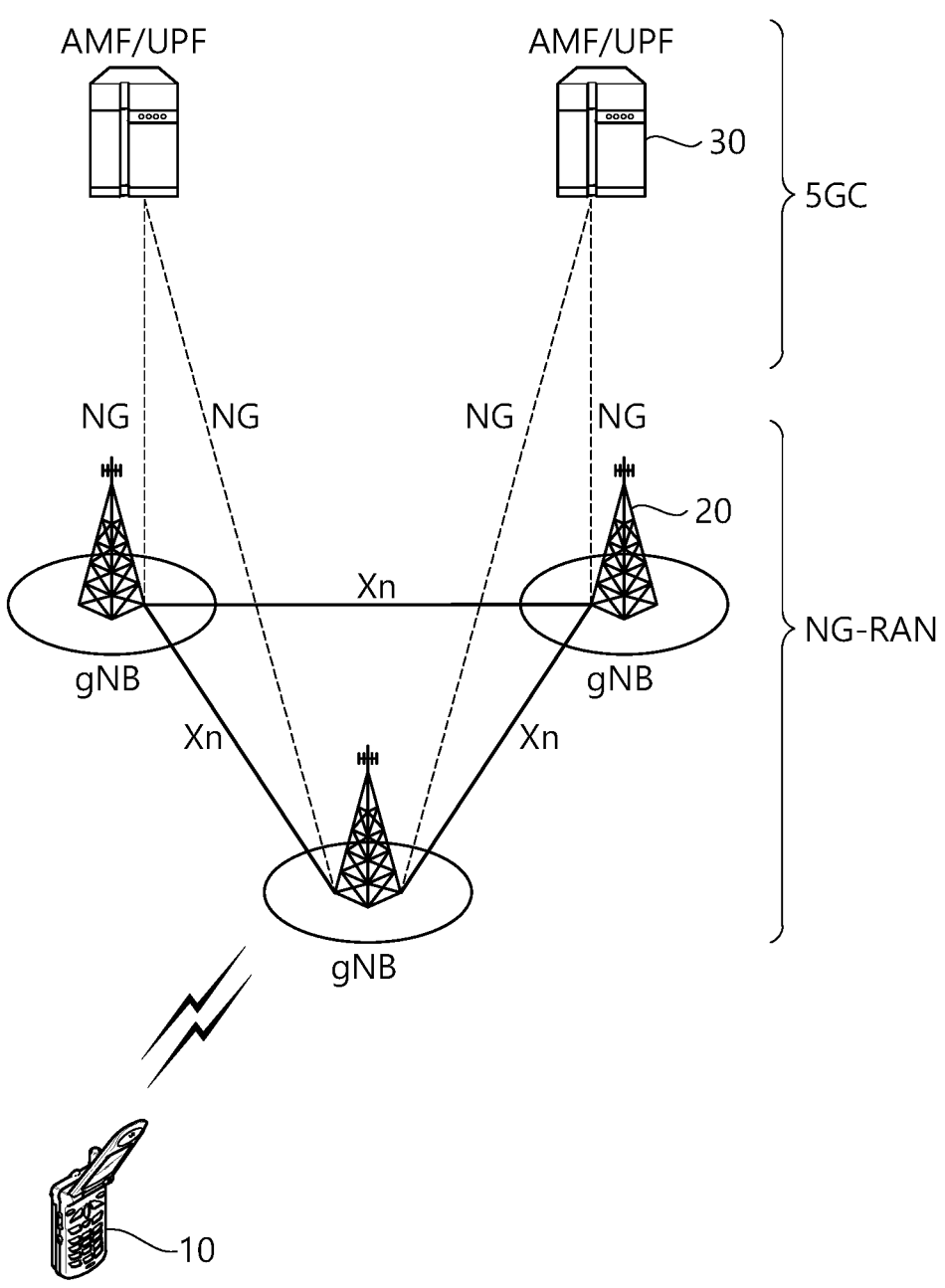
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 3:
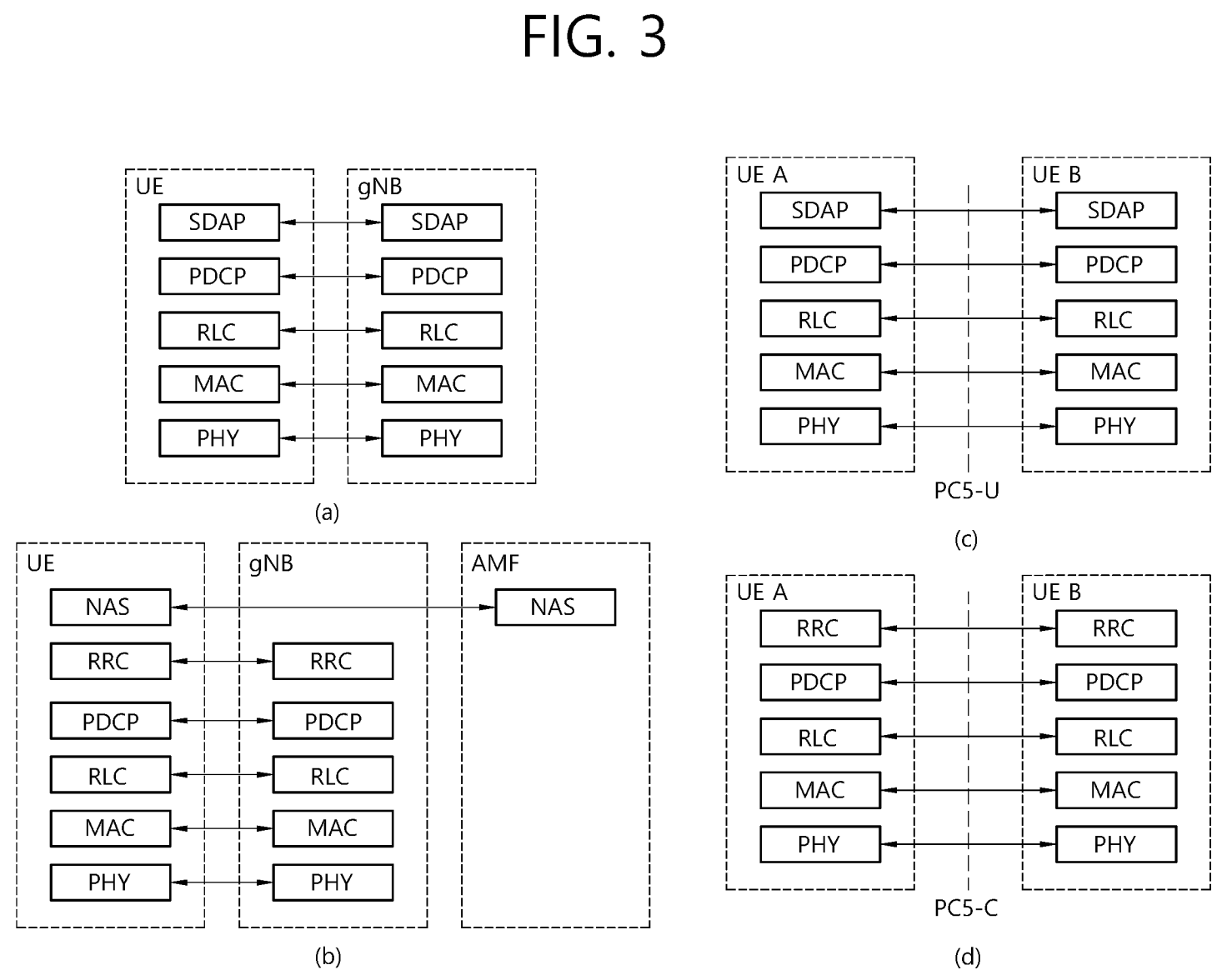

FIG. 3 shows a radio protocol architecture, based on an embodiment of the present disclosure. The embodiment of FIG. 3 may be combined with various embodiments of the present disclosure. Specifically, (a) of FIG. 3 shows a radio protocol stack of a user plane for Uu communication, and (b) of FIG. 3 shows a radio protocol stack of a control plane for Uu communication. (c) of FIG. 3 shows a radio protocol stack of a user plane for SL communication, and (d) of FIG. 3 shows a radio protocol stack of a control plane for SL communication.

Referring to FIG. 3, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
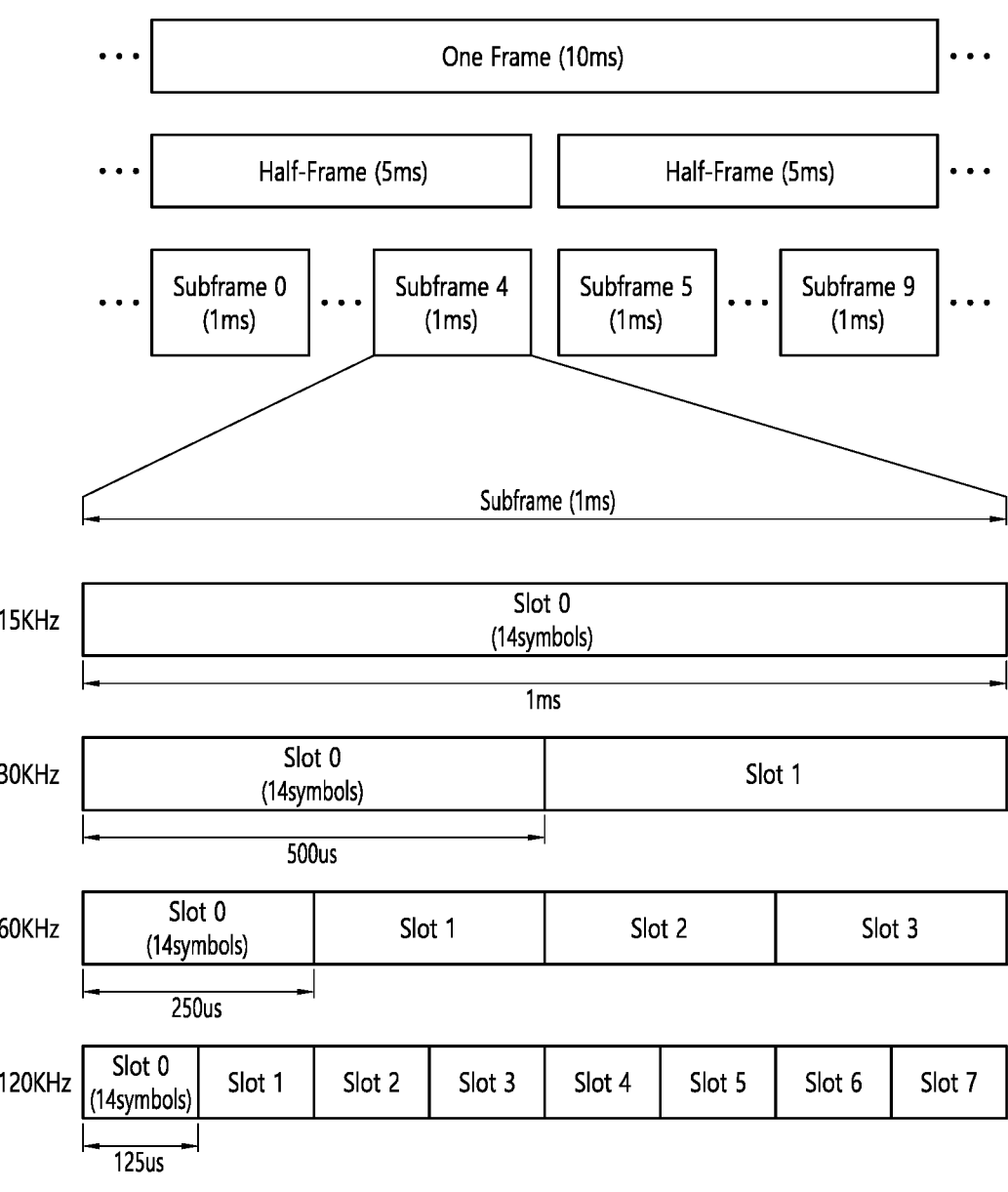
FIG. 4 shows a structure of a radio frame of an NR, based on an embodiment of the present disclosure.

FIG. 4 shows a structure of a radio frame of an NR, based on an embodiment of the present disclosure. The embodiment of FIG. 4 may be combined with various embodiments of the present disclosure.

Referring to FIG. 4, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N_{symb}^{slot}$ | $N_{slot}^{frame, u}$ | $N_{slot}^{subframe, u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N_{symb}^{slot}$ | $N_{slot}^{frame, u}$ | $N_{slot}^{subframe, u}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
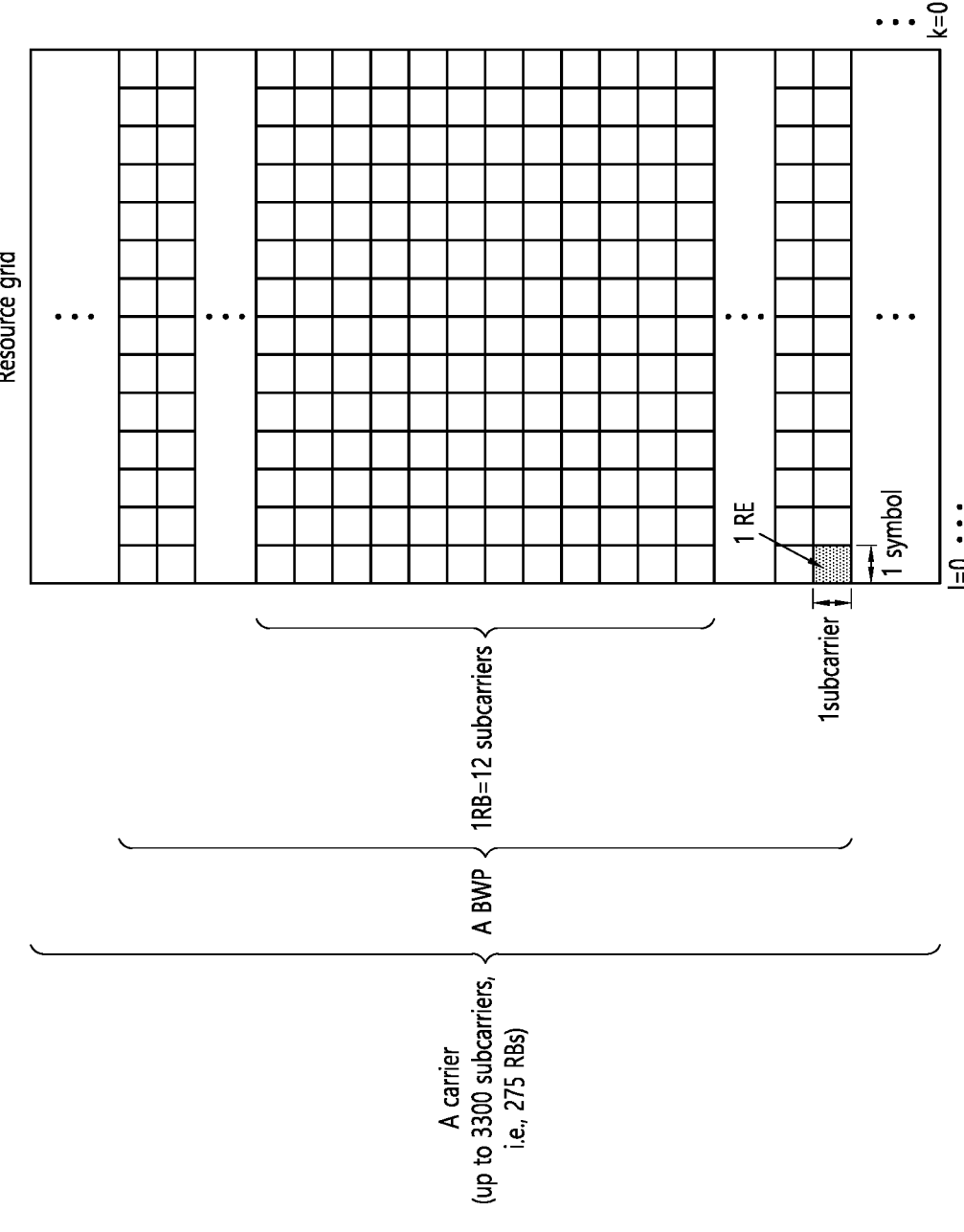
FIG. 5 shows a structure of a slot of an NR frame, based on an embodiment of the present disclosure.

FIG. 5 shows a structure of a slot of an NR frame, based on an embodiment of the present disclosure. The embodiment of FIG. 5 may be combined with various embodiments of the present disclosure.

Referring to FIG. 5, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 6:
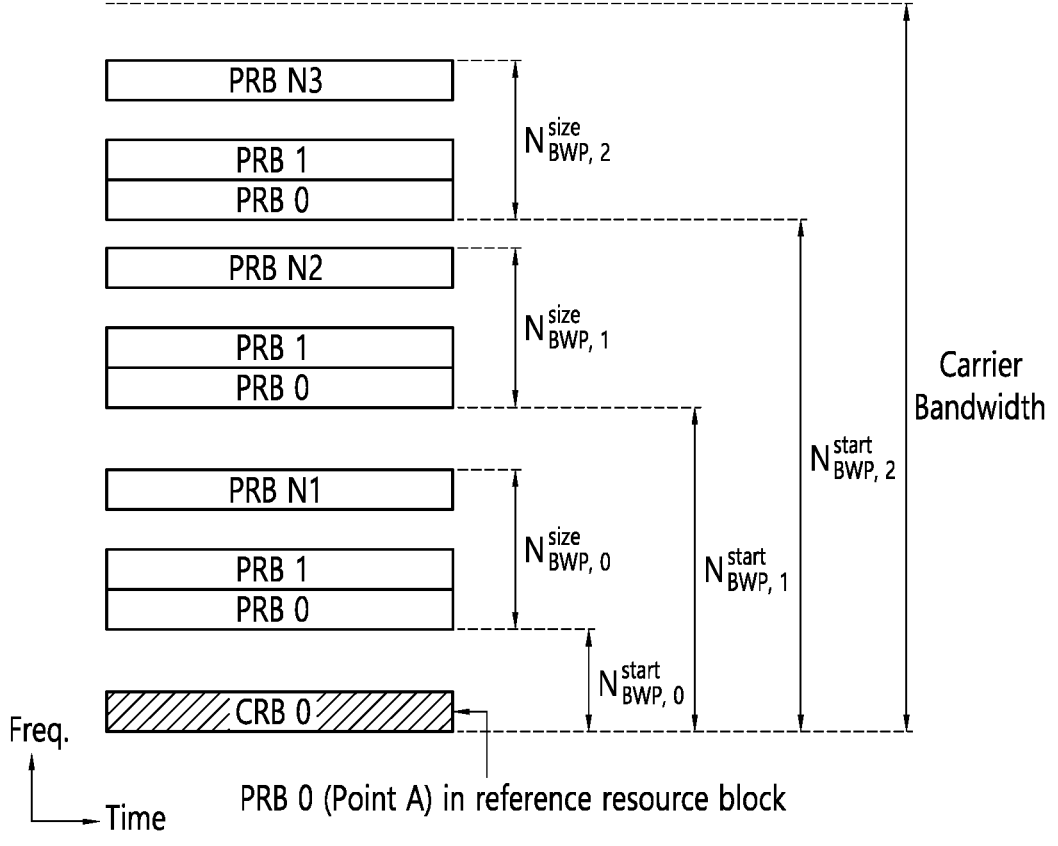
FIG. 6 shows an example of a BWP, based on an embodiment of the present disclosure.

FIG. 6 shows an example of a BWP, based on an embodiment of the present disclosure. The embodiment of FIG. 6 may be combined with various embodiments of the present disclosure. It is assumed in the embodiment of FIG. 6 that the number of BWPs is 3.

Referring to FIG. 6, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/

PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 7:
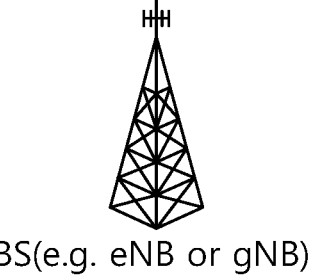
FIG. 7 shows a UE performing V2X or SL communication, based on an embodiment of the present disclosure.
Figure 7:

FIG. 7 shows a UE performing V2X or SL communication, based on an embodiment of the present disclosure. The embodiment of FIG. 7 may be combined with various embodiments of the present disclosure.

Referring to FIG. 7, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 8:
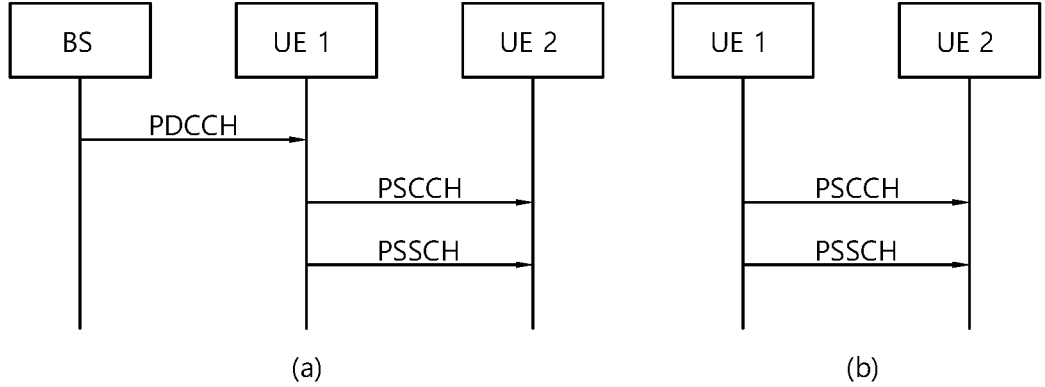
FIG. 8 shows a procedure of performing V2X or SL communication by a UE based on a transmission mode, based on an embodiment of the present disclosure.

FIG. 8 shows a procedure of performing V2X or SL communication by a UE based on a transmission mode, based on an embodiment of the present disclosure. The embodiment of FIG. 8 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 8 shows a UE operation related to an LTE transmission mode 1 or an LTE transmission mode 3. Alternatively, for example, (a) of FIG. 8 shows a UE operation related to an NR resource allocation mode 1. For example, the LTE transmission mode 1 may be applied to general SL communication, and the LTE transmission mode 3 may be applied to V2X communication.

For example, (b) of FIG. 8 shows a UE operation related to an LTE transmission mode 2 or an LTE transmission mode 4. Alternatively, for example, (b) of FIG. 8 shows a UE operation related to an NR resource allocation mode 2.

Referring to (a) of FIG. 8, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (e.g., downlink control information (DCI)) or RRC signaling (e.g., Configured Grant Type 1 or Configured Grant Type 2), and the UE 1 may perform V2X or SL communication with respect to a UE 2 according to the resource scheduling. For example, the UE 1 may transmit sidelink control information (SCI) to the UE 2 through a physical sidelink control channel (PSCCH), and thereafter transmit data based on the SCI to the UE 2 through a physical sidelink shared channel (PSSCH).

Referring to (b) of FIG. 8, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at T1≥0, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a slot. For example, a size of a sub-channel may be configured for the UE or may be pre-configured.

Figure 9:
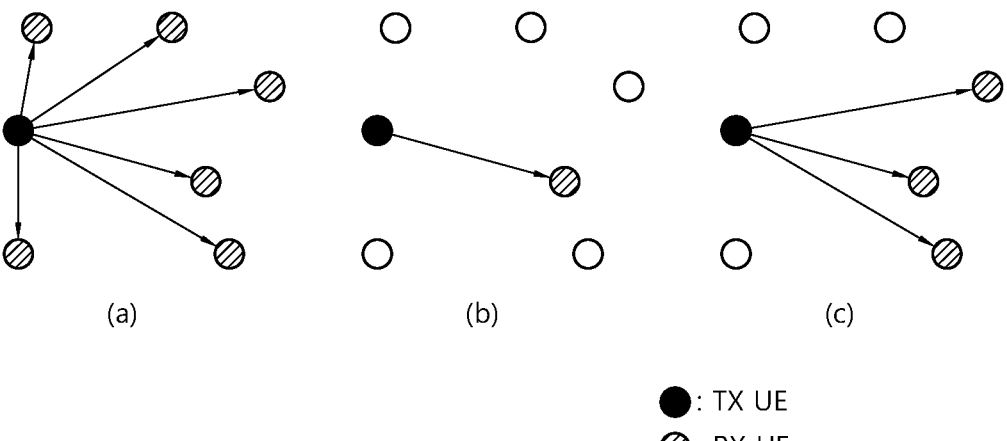
FIG. 9 shows three cast types, based on an embodiment of the present disclosure.

FIG. 9 shows three cast types, based on an embodiment of the present disclosure. The embodiment of FIG. 9 may be combined with various embodiments of the present disclosure. Specifically, (a) of FIG. 9 shows broadcast-type SL communication, (b) of FIG. 9 shows unicast type-SL communication, and (c) of FIG. 9 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, SCI including first SCI configuration field group may be referred to as first SCI or $1^{st}$ SCI, and SCI including second SCI configuration field group may be referred to as second SCI or $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or MCS information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, for example, "configured/configuration" or "defined/definition" may include that a base station or a network transmits information related to "configuration" or information related to "definition" to a UE through pre-defined signaling (e.g., SIB, MAC, RRC, etc.). For example, "configured/configuration" or "defined/definition" may include that the base station or the network configures or pre-configures information related to "configuration" or information related to "definition" for the UE.

Meanwhile, in various embodiments of the present disclosure, a high priority may refer to a small priority value, and a low priority may refer to a large priority value. For example, if a priority value of first transmission is 1 and a priority value of second transmission is 2, a priority of the first transmission may be higher than a priority of the second transmission.

Meanwhile, the UE may perform NR-based SL communication while performing LTE-based UL transmission. Meanwhile, the UE may perform LTE-based SL communication while performing NR-based UL transmission. Herein, for example, the LTE-based UL (or SL) communication and the NR-based SL (or UL) communication may be performed in different carriers and/or different serving cells. For example, the LTE-based UL (or SL) communication and the NR-based SL (or UL) communication may be performed in the same carrier and/or the same serving cell. For example, if the LTE-based UL (or SL) communication and the NR-based SL (or UL) communication are performed in different carriers and/or different serving cells, a method for the UE to efficiently control transmit power between SL transmission and UL transmission may be required. For example, if the LTE-based UL (or SL) communication and the NR-based SL (or UL) communication are performed in the same carrier and/or the same serving cell, a criterion for the UE to select one of UL transmission and SL communication may be required.

For example, if (i) LTE-based UL transmission and NR-based SL transmission by the UE overlap in the time domain, and (ii) the UE can simultaneously perform the LTE-based UL transmission and the NR-based SL transmission, a maximum power value for UL transmission and/or SL transmission may be (pre-)configured or configured through RRC signaling to the UE. For example, the base station/network may transmit information related to maximum power for UL transmission and/or SL transmission to the UE. For example, the maximum power value for UL transmission or SL transmission of the UE may be configured differently for (i) a case in which UL transmission and SL transmission are simultaneously performed by the UE and (ii) other cases. For example, when the UE simultaneously performs UL transmission and SL transmission, if the sum of power related to UL transmission and power related to SL transmission exceeds the maximum power (P_C-MAX) of the UE, the UE may reduce power for transmission of a link having a lower priority according to priorities of UL transmission and SL transmission such that the sum of power is less than the maximum power of the UE.

For example, if (i) NR-based UL transmission and LTE-based SL transmission by the UE overlap in the time domain, and (ii) the UE can simultaneously perform the NR-based UL transmission and the LTE-based SL transmission, a maximum power value for UL transmission and/or SL transmission may be (pre-)configured or configured through RRC signaling to the UE. For example, the base station/network may transmit information related to maximum power for UL transmission and/or SL transmission to the UE. For example, the maximum power value for UL transmission or SL transmission of the UE may be configured differently for (i) a case in which UL transmission and SL transmission are simultaneously performed by the UE and (ii) other cases. For example, when the UE simultaneously performs UL transmission and SL transmission, if the sum of power related to UL transmission and power related to SL transmission exceeds the maximum power (P_C-MAX) of the UE, the UE may reduce power for transmission of a link having a lower priority according to priorities of UL transmission and SL transmission such that the sum of power is less than the maximum power of the UE.

For example, a maximum power value configured for UL transmission or SL transmission may be independently configured to the UE according to a combination of RATs. For example, the base station/network may transmit maximum power information (e.g., a first maximum power value) related to the LTE-based UL transmission and the NR-based SL transmission to the UE, and the base station/network may transmit maximum power information (e.g., a second maximum power value) related to the NR-based UL transmission and the LTE-based SL transmission to the UE. For example, the first maximum power value and the second maximum power value may be configured independently. For example, the first maximum power value and the second maximum power value may be configured differently. For example, the base station/network may transmit maximum power information (e.g., a first maximum power value) related to the LTE-based UL transmission and the NR-based SL transmission to the UE, and the base station/network may not provide the UE with maximum power information for sidelink in relation to the NR-based UL transmission and the LTE-based SL transmission.

For example, if (i) LTE-based UL transmission and NR-based SL transmission by the UE overlap in the time domain, and (ii) the UE cannot simultaneously perform the LTE-based UL transmission and the NR-based SL transmission, the UE may perform transmission of a link having a higher priority according to priorities of UL transmission and SL transmission. On the other hand, for example, the UE may drop transmission of a link having a lower priority according to priorities of UL transmission and SL transmission.

For example, if (i) NR-based UL transmission and LTE-based SL transmission by the UE overlap in the time domain, and (ii) the UE cannot simultaneously perform the NR-based UL transmission and the LTE-based SL transmission, the UE may perform transmission of a link having a higher priority according to priorities of UL transmission and SL transmission. On the other hand, for example, the UE may drop transmission of a link having a lower priority according to priorities of UL transmission and SL transmission.

For example, the UE may determine a priority among a plurality of transmissions based on Tables 5 to 8. For example, 3GPP TS 38.213 V16.2.0 may be referred to as a method for the UE to determine priority among a plurality of transmissions.

TABLE 5

16.2.4 Prioritization of transmissions/receptions
16.2.4.1 Simultaneous NR and E-UTRA transmission/reception If a UE
- would transmit a first channel/signal using E-UTRA radio access and a second channel/signal using NR radio access, and
- a transmission of the first channel/signal would overlap in time with a transmission of the second channel/signal, and
- the priorities of the two channels/signals are known to the UE T msec prior to the start of the earlier of the two transmissions
the UE transmits only the channel/signal with the higher priority as determined by the SCI formats scheduling the transmissions or, in case of a S-SS/PSBCH block or a sidelink synchronization signal using E-UTRA radio access, as indicated by higher layers or, in case of PSFCH, equal to the priority of the corresponding PSSCH.
If a UE
- would respectively transmit or receive a first channel/signal using E-UTRA radio access and receive or transmit a second channel/signal using NR radio access, and
- a transmission or reception of the first channel/signal would respectively overlap in time with a reception or transmission of the second channel/signal, and
- the priorities of the two channels/signals are known to the UE 7 msec prior to the start of the earlier transmission or reception
the UE transmits or receives only the channel/signal with the higher priority as determined by the SCI formats scheduling the transmissions or, in case of a S-SS/PSBCH block or a sidelink synchronization signal using E-UTRA radio access, as indicated by higher layers or, in case of PSFCH, equal to the priority of the corresponding PSSCH.

TABLE 6

16.2.4.2 Simultaneous PSFCH transmission/reception

If a UE
- would transmit $N_{sch, Tx, PSFCH}$ PSFCHs and receive $N_{sch, Rx, PSFCH}$ PSFCHs, and
- transmissions of the $N_{sch, Tx, PSFCH}$ PSFCHs would overlap in time with receptions of the $N_{sch, Rx, PSFCH}$ PSFCHs TABLE 6-continued

| 16.2.4.2 Simultaneous PSFCH transmission/reception |
| --- | the UE transmits or receives only a set of PSFCHs corresponding to the smallest priority field value,
as determined by a first set of SCI format 1-A and a second set of SCI format 1-A [5, TS 38.212]
that
are respectively associated with the $N_{sch, Tx, PSFCH}$ PSFCHs and the $N_{sch, Rx, PSFCH}$ PSFCHs.
If a UE would transmit $N_{sch, Tx, PSFCH}$ PSFCHs in a PSFCH transmission occasion, the UE transmits
$N_{Tx, PSFCH}$ PSFCHs corresponding to the smallest $N_{Tx, PSFCH}$ priority field values indicated in all
SCI formats 1-A associated with the PSFCH transmission occasion.

TABLE 7

| 16.2.4.3 Simultaneous SL and UL transmissions |
| --- |

If a UE
  - would simultaneously transmit on the UL and on the SL of a serving cell, and
  - the UE is not capable of simultaneous transmissions on the UL and on the SL of the serving
    cell
the UE transmits only on the link, UL or SL, with the higher priority.
If a UE
  - is capable of simultaneous transmissions on the UL and on the SL of two respective carriers
    of a serving cell, or of two respective serving cells,
  - would transmit on the UL and on the SL of the two respective carriers of the serving cell, or
    of the two respective serving cells,
  - the transmission on the UL would overlap with the transmission on the SL over a time period,
    and
  - the total UE transmission power over the time period would exceed $P_{CMAX}$
the UE
  - reduces the power for the UL transmission prior to the start of the UL transmission, if the SL
    transmission has higher priority than the UL transmission as determined in Clause 16.2.4.3.1,
    so that the total UE transmission power would not exceed $P_{CMAX}$
  - reduces the power for the SL transmission prior to the start of the SL transmission, if the UL
    transmission has higher priority than the SL transmission as determined in Clause 16.2.4.3.1,
    so that the total UE transmission power would not exceed $P_{CMAX}$

TABLE 8

| 16.2.4.3.1 Prioritizations for sidelink and uplink transmissions |
| --- |

A UE performs prioritization between SL transmissions and UL transmissions after performing the
procedures described in Clause 9.2.5 and in Clause 6.1 of [6, TS 38.214].
PSFCH transmissions in a slot have a same priority value as the smallest priority value among PSSCH
receptions with corresponding HARQ-ACK information provided by the PSFCH transmissions in
the slot.
A priority of S-SS/PSBCH block transmission is provided by sl-SSB-PriorityNR.
For prioritization between PSFCH/S-SS/PSBCH block transmission and UL transmission other than
a PRACH, or a PUSCH scheduled by an UL grant in a RAR, or a PUCCH with sidelink HARQ-
ACK information report
        - if the UL transmission is for a PUSCH or for a PUCCH with priority index 1,
          - if sl-Priority ThresholdULURLLC is provided
            - the SL transmission has higher priority than the UL transmission if a smallest priority
              value of the SL transmission(s) is smaller than sl-PriorityThresholdULURLLC;
              otherwise, the UL transmission has higher priority than the SL transmission
          - else
            - the UL transmission has higher priority than the SL transmission
        - else
          - the SL transmission has higher priority than the UL transmission if the smallest priority
           value of the SL transmission(s) is smaller than sl-PriorityThreshold; otherwise, the UL
           transmission has higher priority than the SL transmission
A PRACH transmission, or a PUSCH scheduled by an UL grant in a RAR, has higher priority than
a PSFCH or a S-SS/PSBCH block transmission.
A PUCCH transmission with a sidelink HARQ-ACK information report has higher priority than a
SL transmission if a priority value of the PUCCH is smaller than a priority value of the SL
transmission. The priority value of the PUCCH transmission is as described in Clause 16.5. If the
priority value of the PUCCH transmission is larger than the priority value of the SL transmission, the
SL transmission has higher priority.
When one or more SL transmissions from a UE overlap in time with multiple non-overlapping UL
transmissions from the UE, the UE performs the SL transmissions if at least one SL transmission is
prioritized over all UL transmissions subject to the UE processing timeline with respect to the first
SL transmission and the first UL transmission.
When one or more UL transmissions from a UE overlap in time with multiple non-overlapping SL
transmissions, the UE performs the UL transmissions if at least one UL transmission is prioritized TABLE 8-continued 16.2.4.3.1 Prioritizations for sidelink and uplink transmissions over all SL transmissions subject to the UE processing timeline with respect to the first SL
transmission and the first UL transmission.
When one SL transmission overlaps in time with one or more overlapping UL transmissions, the UE
performs the SL transmission if the SL transmission is prioritized over all UL transmissions subject
to both the UE multiplexing and processing timelines with respect to the first SL transmission and
the first UL transmission, where the UE processing timeline with respect to the first SL transmission
and the first UL transmission is same as when one or more SL transmissions overlap in time with
multiple non-overlapping UL transmissions.
When one SL transmission overlaps in time with one or more overlapping UL transmissions, the UE
performs the UL transmission if at least one UL transmission is prioritized over the SL transmission
subject to both the UE multiplexing and processing timelines with respect to the first SL transmission
and the first UL transmission, where the UE processing timeline with respect to the first SL
transmission and the first UL transmission is same as when one or more SL transmissions overlap in
time with multiple non-overlapping UL transmissions.

Figure 10:
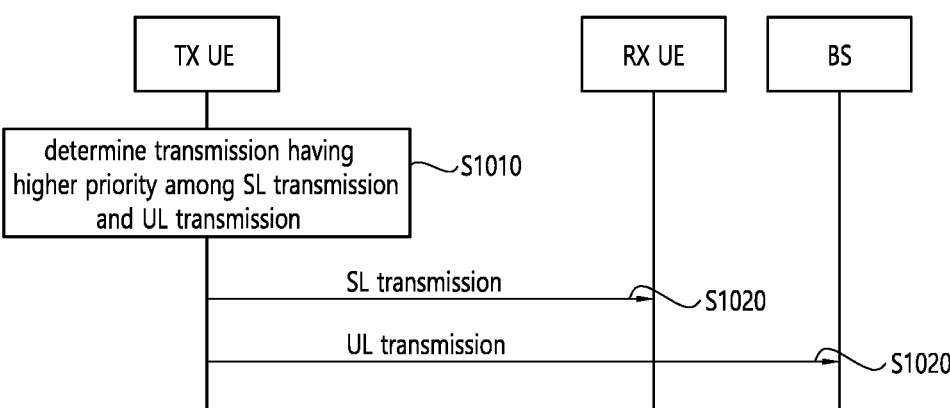
FIG. 10 shows a procedure for a UE to perform at least one of UL transmission and/or SL transmission based on priorities, based on an embodiment of the present disclosure.

FIG. 10 shows a procedure for a UE to perform at least one of UL transmission and/or SL transmission based on priorities, based on an embodiment of the present disclosure. The embodiment of FIG. 10 may be combined with various embodiments of the present disclosure.

Referring to FIG. 10, in step S1010, the UE may determine transmission having a higher priority among SL transmission and UL transmission. For example, the UE may determine transmission having a higher priority among SL transmission and UL transmission based on various embodiments of the present disclosure.

In step S1020, the UE may perform at least one of SL transmission and/or UL transmission. For example, the UE may perform only high-priority transmission among SL transmission and UL transmission, and the UE may not perform low-priority transmission among SL transmission and UL transmission. For example, the UE may reduce transmit power related to low-priority transmission among SL transmission and UL transmission until maximum transmit power is not exceeded.

Hereinafter, a method for determining a priority of SL transmission or UL transmission and device(s) supporting the same will be described in detail.

For example, priority rules for UL transmission and SL transmission may be different according to a combination of RATs. For example, according to the combination of RATs, a priority threshold used for prioritization may be separately (pre-)configured to the UE or may be configured to the UE through RRC signaling.

For example, if the UE performs LTE-based UL transmission and NR-based SL transmission, a priority between SL transmission and UL transmission may be determined based on RAT. For example, the UE may determine a priority between SL transmission and UL transmission based on RAT. For example, the base station/network may configure a priority between SL transmission and UL transmission to the UE based on RAT. In this case, for example, LTE-based transmission may have a high priority. For example, a priority related to LTE-based transmission may be higher than a priority related to NR-based transmission.

For example, if the UE performs LTE-based UL transmission and NR-based SL transmission, a priority between SL transmission and UL transmission may be determined based on a link type. For example, the UE may determine a priority between SL transmission and UL transmission based on a link type. For example, the base station/network may configure a priority between SL transmission and UL transmission to the UE based on a link type. In this case, for example, SL transmission may have a high priority. For example, a priority related to SL transmission may be higher than a priority related to UL transmission. For example, transmission of a signal/channel related to random access, such as PRACH, MSG3, etc. may be excluded from the UL transmission. For example, a priority of transmission of the signal/channel related to the random access may always be higher than a priority of SL transmission. Alternatively, for example, UL transmission may have a higher priority. For example, a priority related to UL transmission may be higher than a priority related to SL transmission.

For example, if the UE performs LTE-based UL transmission and NR-based SL transmission, a priority between SL transmission and UL transmission may be determined based on an L1 priority value for SL transmission and a priority threshold configured by the NR base station. For example, the UE may determine a priority between SL transmission and UL transmission, based on an L1 priority value for SL transmission and a priority threshold configured by the NR base station. For example, the L1 priority value for SL transmission may be information related to a priority included in SCI. For example, the UE may receive information related to the priority threshold from the NR base station (e.g., gNB).

For example, if a priority value for SL transmission is less than an SL threshold value for eMBB communication (e.g., sl-PriorityThreshold), the UE may determine that a priority of SL transmission is higher than a priority of UL transmission. For example, if a priority value for SL transmission is greater than or equal to an SL threshold value for eMBB communication (e.g., sl-PriorityThreshold), the UE may determine that a priority of UL transmission is higher than a priority of SL transmission. For example, the priority value for SL transmission may be included in SCI. For example, the base station/network may transmit information related to the SL threshold value to the UE.

For example, if a priority value for SL transmission is less than an SL threshold value for URLLC communication (e.g., sl-PriorityThresholdULURLLC), the UE may determine that a priority of SL transmission is higher than a priority of UL transmission. For example, if a priority value for SL transmission is greater than or equal to an SL threshold value for URLLC communication (e.g., sl-PriorityThresholdU-LURLLC), the UE may determine that a priority of UL transmission is higher than a priority of SL transmission. For example, the priority value for SL transmission may be included in SCI. For example, the base station/network may transmit information related to the SL threshold value to the UE. Herein, for example, transmission of a signal/channel related to random access, such as PRACH, MSG3, etc. may be excluded from the UL transmission. For example, a priority of transmission of the signal/channel related to the random access may always be higher than a priority of SL transmission. Alternatively, for example, if an SL threshold value for URLLC communication is not configured for the UE, the UE may determine that a priority of UL transmission is higher than a priority of SL transmission.

For example, if the UE performs LTE-based UL transmission and NR-based SL transmission, a priority between SL transmission and UL transmission may be determined based on an L1 priority value for SL transmission and a priority threshold configured by the LTE base station. For example, the UE may determine a priority between SL transmission and UL transmission, based on an L1 priority value for SL transmission and a priority threshold configured by the LTE base station. For example, the L1 priority value for SL transmission may be information related to a priority included in SCI. For example, the UE may receive information related to the priority threshold from the LTE base station (e.g., eNB).

For example, if a priority value for SL transmission is less than an SL threshold value (e.g., thresSL-TxPrioritization), the UE may determine that a priority of SL transmission is higher than a priority of UL transmission. For example, if a priority value for SL transmission is greater than or equal to an SL threshold (e.g., thresSL-TxPrioritization), the UE may determine that a priority of UL transmission is higher than a priority of SL transmission. For example, the priority value for SL transmission may be included in SCI. For example, the base station/network may transmit information related to the SL threshold value to the UE. Herein, for example, transmission of a signal/channel related to random access, such as PRACH, MSG3, etc. may be excluded from the UL transmission. For example, a priority of transmission of the signal/channel related to the random access may always be higher than a priority of SL transmission. Alternatively, for example, if an SL threshold value is not configured for the UE in LTE, the UE may determine that a priority of UL transmission is higher than a priority of SL transmission.

For example, if the UE performs NR-based UL transmission and LTE-based SL transmission, a priority between SL transmission and UL transmission may be determined based on RAT. For example, the UE may determine a priority between SL transmission and UL transmission based on RAT. For example, the base station/network may configure a priority between SL transmission and UL transmission to the UE based on RAT. In this case, for example, LTE-based transmission may have a high priority. For example, a priority related to LTE-based transmission may be higher than a priority related to NR-based transmission. Herein, for example, transmission of a signal/channel related to random access, such as PRACH, MSG3, etc. may be excluded from the UL transmission. For example, a priority of transmission of the signal/channel related to the random access may always be higher than a priority of SL transmission.

For example, if the UE performs NR-based UL transmission and LTE-based SL transmission, a priority between SL transmission and UL transmission may be determined based on a link type. For example, the UE may determine a priority between SL transmission and UL transmission based on a link type. For example, the base station/network may configure a priority between SL transmission and UL transmission to the UE based on a link type. In this case, for example, SL transmission may have a high priority. For example, a priority related to SL transmission may be higher than a priority related to UL transmission. Alternatively, for example, UL transmission may have a high priority. For example, a priority related to UL transmission may be higher than a priority related to SL transmission.

For example, if the UE performs NR-based UL transmission and LTE-based SL transmission, a priority between SL transmission and UL transmission may be determined based on an L1 priority value for SL transmission and a priority threshold configured by the NR base station. For example, the UE may determine a priority between SL transmission and UL transmission, based on an L1 priority value for SL transmission and a priority threshold configured by the NR base station. For example, the L1 priority value for SL transmission may be information related to a priority included in SCI. For example, the UE may receive information related to the priority threshold from the NR base station (e.g., gNB).

For example, if UL transmission corresponds to URLLC (e.g., PUCCH or PUSCH with priority index 1), and a priority value for SL transmission is less than an SL threshold value for URLLC communication (e.g., sl-PriorityThresholdULURLLC), the UE may determine that a priority of SL transmission is higher than a priority of UL transmission. Otherwise, the UE may determine that a priority of UL transmission is higher than a priority of SL transmission. Alternatively, for example, if an SL threshold value for URLLC communication is not configured for the UE, the UE may determine that a priority of UL transmission is higher than a priority of SL transmission. For example, if UL transmission does not correspond to URLLC (e.g., PUCCH or PUSCH with priority index 0), and a priority value for SL transmission is less than an SL threshold value for eMBB communication (e.g., sl-PriorityThreshold), the UE may determine that a priority of SL transmission is higher than a priority of UL transmission. Otherwise, the UE may determine that a priority of UL transmission is higher than a priority of SL transmission. For example, transmission of a signal/channel related to random access, such as PRACH, MSG3, etc. may be excluded from the UL transmission. For example, a priority of transmission of the signal/channel related to the random access may always be higher than a priority of SL transmission. For example, if a priority threshold related to NR SL is not configured to the UE and a priority threshold related to LTE SL is configured to the UE, the UE may determine a priority of UL transmission or SL transmission based on the priority threshold related to LTE SL.

For example, if the UE performs NR-based UL transmission and LTE-based SL transmission, a priority between SL transmission and UL transmission may be determined based on an L1 priority value for SL transmission and a priority threshold configured by the LTE base station. For example, the UE may determine a priority between SL transmission and UL transmission, based on an L1 priority value for SL transmission and a priority threshold configured by the LTE base station. For example, the L1 priority value for SL transmission may be information related to a priority included in SCI. For example, the UE may receive information related to the priority threshold from the LTE base station (e.g., eNB).

For example, if a priority value for SL transmission is less than an SL threshold value (e.g., thresSL-TxPrioritization), the UE may determine that a priority of SL transmission is higher than a priority of UL transmission. For example, if a priority value for SL transmission is greater than or equal to an SL threshold value (e.g., thresSL-TxPrioritization), the UE may determine that a priority of UL transmission is higher than a priority of SL transmission. Herein, for example, transmission of a signal/channel related to random access, such as PRACH, MSG3, etc. may be excluded from the UL transmission. For example, a priority of transmission of the signal/channel related to the random access may always be higher than a priority of SL transmission.

For example, if the UE performs NR-based UL transmission and LTE-based SL transmission, a priority between SL transmission and UL transmission may be determined based on (i) an L1 priority value for SL transmission, (ii) a priority threshold configured by the NR base station and (iii) a priority threshold configured by the LTE base station. For example, the UE may determine a priority between SL transmission and UL transmission, based on (i) an L1 priority value for SL transmission, (ii) a priority threshold configured by the NR base station and (iii) a priority threshold configured by the LTE base station. For example, the L1 priority value for SL transmission may be information related to a priority included in SCI. For example, the UE may receive information related to the priority threshold from the LTE base station (e.g., eNB) and the NR base station (e.g., gNB), respectively.

For example, if UL transmission corresponds to URLLC (e.g., PUCCH or PUSCH with priority index 1), and a priority value for SL transmission is less than an SL threshold value for URLLC communication (e.g., sl-PriorityThresholdULURLLC) configured by the NR base station, the UE may determine that a priority of SL transmission is higher than a priority of UL transmission. Otherwise, the UE may determine that a priority of UL transmission is higher than a priority of SL transmission. Herein, for example, transmission of a signal/channel related to random access, such as PRACH, MSG3, etc. may be excluded from the UL transmission. For example, a priority of transmission of the signal/channel related to the random access may always be higher than a priority of SL transmission. Alternatively, for example, if an SL threshold value for URLLC communication is not configured for the UE, the UE may determine that a priority of UL transmission is higher than a priority of SL transmission.

For example, if UL transmission does not correspond to URLLC (e.g., PUCCH or PUSCH with priority index 0), and a priority value for SL transmission is less than an SL threshold value (e.g., thresSL-TxPrioritization) configured by the LTE base station, the UE may determine that a priority of SL transmission is higher than a priority of UL transmission. Otherwise, the UE may determine that a priority of UL transmission is higher than a priority of SL transmission. Herein, for example, transmission of a signal/channel related to random access, such as PRACH, MSG3, etc. may be excluded from the UL transmission. For example, a priority of transmission of the signal/channel related to the random access may always be higher than a priority of SL transmission. In various embodiments of the present disclosure, the UE may know the priority value for SL transmission before a specific time from the SL reception time and the UL transmission time. For example, the specific time may be a value selected by the UE among values less than or equal to 4 msec according to UE implementation.

Various embodiments of the present disclosure may be used to determine transmission having a higher priority among SL reception or UL transmission based on different radio access technologies (RATs) (for example, LTE or NR). In this case, for example, the UE may know the priority value for SL reception before a specific time from the SL reception time and the UL transmission time. For example, the specific time may be a value selected by the UE among values less than or equal to 4 msec according to UE implementation.

Based on various embodiments of the present disclosure, when UL and SL transmissions using different RATs, such as LTE and NR, overlap each other, the UE can efficiently perform SL communication and UL communication.

Meanwhile, two types of frequency ranges (FR) are defined in NR. The Sub 6 GHz range may be referred to as FR1, and the millimeter wave range may be referred to as FR2. The frequency ranges of FR1 and FR2 may be defined as shown in Table 3 or Table 4.

In the case of a situation in which the UE communicates on a high carrier frequency such as FR2 and/or a situation in which the UE moves at a high speed, a phase of signals may change rapidly in units of a symbol while the UE transmits and receives a PSCCH and/or a PSSCH. Accordingly, in the above situation, a phase tracking reference signal (PT-RS) for phase compensation may be required. In the present disclosure, the PT-RS may be a reference signal for compensating phase noise. In order to compensate phase noise, the PT-RS may be transmitted after being mapped almost evenly in the time domain to time-frequency resources.

Meanwhile, in order to increase usage efficiency of resources for data, a form in which resources for a PSCCH are surrounded by resources for a PSSCH may be supported in a next-generation communication system.

Figure 11:
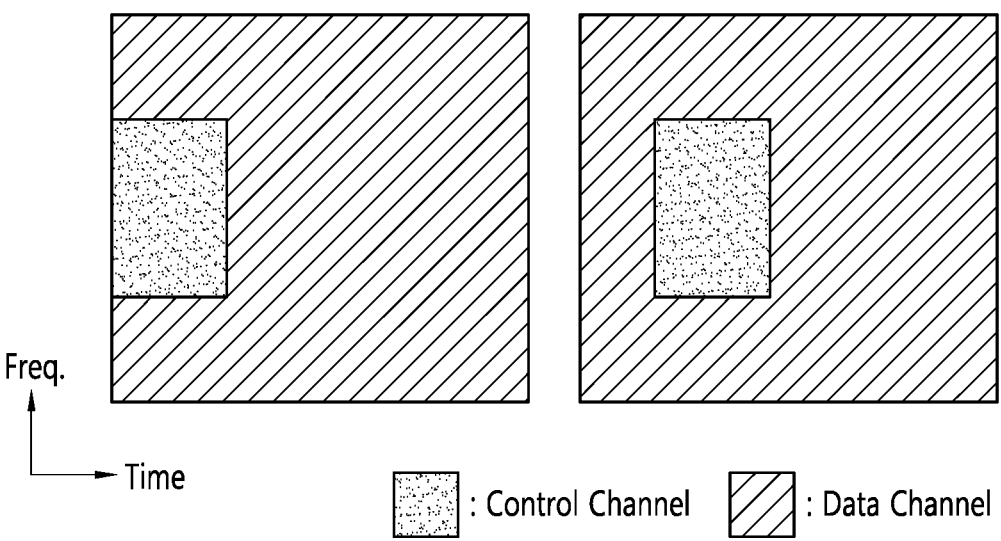
FIG. 11 shows an example of resource allocation for a data channel or a control channel, based on an embodiment of the present disclosure.

FIG. 11 shows an example of resource allocation for a data channel or a control channel, based on an embodiment of the present disclosure. The embodiment of FIG. 11 may be combined with various embodiments of the present disclosure.

Referring to FIG. 11, resources for a control channel (e.g., PSCCH) may be allocated in a form surrounded by resources for a data channel (e.g., PSSCH). That is, the PSCCH and the PSSCH may be subjected to frequency division multiplexing (FDM) for a specific symbol group or one or more (adjacent) symbols, and only PSSCH may be transmitted on symbols other than the specific symbol group or one or more (adjacent) symbols.

Hereinafter, based on an embodiment of the present disclosure, a method for transmitting a reference signal in sidelink communication and device(s) supporting the same will be described.

Figure 12:
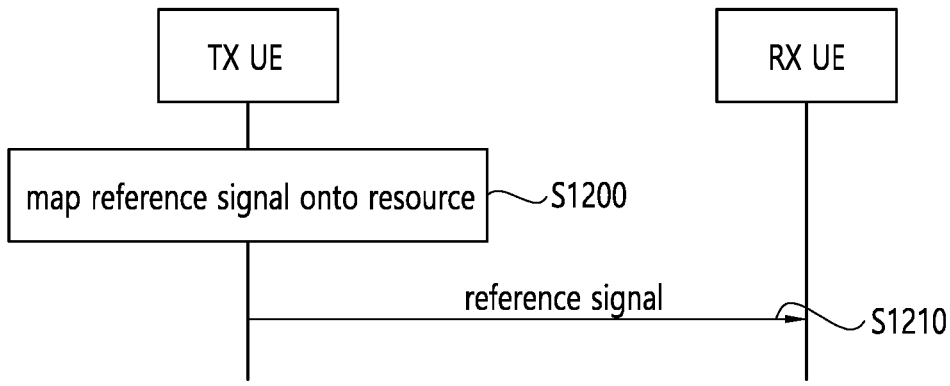
FIG. 12 shows a method for a transmitting UE to transmit a reference signal, based on an embodiment of the present disclosure.

FIG. 12 shows a method for a transmitting UE to transmit a reference signal, based on an embodiment of the present disclosure. The embodiment of FIG. 12 may be combined with various embodiments of the present disclosure.

Referring to FIG. 12, in step S1200, the transmitting UE may generate a sequence of a reference signal. In addition, the transmitting UE may map the reference signal onto a (time and/or frequency) resource. For example, the reference signal may include at least one of a DMRS for demodulating a PSCCH or a PT-RS for phase compensation for a PSSCH. In the present disclosure, the DMRS for demodulating the PSCCH may be referred to as a DMRS for PSCCH, a DMRS related to PSCCH, or a PSCCH DMRS. In the present disclosure, the PT-RS for phase compensation for the PSSCH may be referred to as a PT-RS for PSSCH, a PT-RS related to PSSCH, or a PSSCH PT-RS. For example, the resource may include at least one of a resource for transmitting a PSCCH or a resource for transmitting a PSSCH. For example, the transmitting UE may generate a PT-RS sequence differently depending on whether transform precoding is enabled.

For example, the transmitting UE may generate the PT-RS sequence based on Table 9. In addition, the transmitting UE may map the PT-RS to a resource (e.g., a resource block) based on Tables 10A and 10B, and the transmitting UE may transmit the PT-RS. Specifically, 3GPP TS 38.211 V16.2.0, 3GPP TS 38.212 V16.2.0, and 3GPP TS 38.214 V16.2.0 may be referred to for a procedure for transmitting the PT-RS by the transmitting UE.

TABLE 9

8.4.1.2.1 Sequence generation

The precoded sidelink phase-tracking reference signal for subcarrier k on layer j is given by $$r^{(\tilde{p}_j)}(m) = \begin{cases} r(m) & \text{if } j = j' \text{ or } j = j'' \\ 0 & \text{otherwise} \end{cases}$$

where
    antenna ports $\tilde{p}_j'$ or $\{\tilde{p}_j, \tilde{p}_{j''}\}$ associated with PT-RS transmission are given by clause 8.2.3 of 3GPP TS 38.214 V16.2.0.
    r(m) is given by clause 8.4.1.1.1 of 3GPP TS 38.211 V16.2.0 at the position of a DM-RS symbol.

TABLE 10A 8.4.1.2.2 Mapping to physical resources

The UE shall transmit phase-tracking reference signals only in the resource blocks used for the PSSCH, and only if the procedure in 3GPP TS 38.214 V16.2.0 indicates that phase-tracking reference signals are being used.
The PSSCH PT-RS shall be mapped to resource elements according to $$\begin{bmatrix} a_{k,l}^{(p_0,\mu)} \\ \vdots \\ a_{k,l}^{(p_{\rho-1},\mu)} \end{bmatrix} = \beta_{DMRS}^{PSSCH} W \begin{bmatrix} r^{(\tilde{p}_0)}(2n + k') \\ \vdots \\ r^{(\tilde{p}_{\upsilon-1})}(2n + k') \end{bmatrix}$$

$$k = 4n + 2k' + \Delta$$

when all the following conditions are fulfilled
    l is within the OFDM symbols allocated for the PSSCH transmission;
    resource element (k, l) is not used for sidelink CSI-RS, PSCCH, nor DM-RS associated with PSSCH;
    k' and $\Delta$ correspond to $\tilde{p}_0, \ldots, \tilde{p}_{\upsilon-1}$
The precoding matrix W is given by clause 8.3.1.4 of 3GPP TS 38.211 V16.2.0.
The set of time indices l defined relative to the start of the PSSCH allocation is defined by
    1. set i = 0 and $l_{ref}$ = 0
    2. if any symbol in the interval max $(l_{ref} + (i - 1)L_{PT-RS} + 1, l_{ref})$
        overlaps with a symbol used for DM-RS according to clause
        8.4.1.1.3 of 3GPP TS 38.211 V16.2.0
        set i = 1
        set $l_{ref}$ to the symbol index of the DM-RS symbol
        repeat from step 2 as long as $l_{ref} + iL_{PT-RS}$ is inside the PSSCH
        allocation
    3. add $l_{ref} + iL_{PT-RS}$ to the set of time indices for PT-RS
    4. increment i by one
    5. repeat from step 2 above as long as $l_{ref} + iL_{PT-RS}$ is inside the
PSSCH allocation where $L_{PT-RS} \in \{1,2,4\}$ is given by clause 8.4.3 of
3GPP TS 38.214 V16.2.0.
For the purpose of PT-RS mapping, the resource blocks allocated for PSSCH transmission are numbered from 0 to $N_{RB} - 1$ from the lowest scheduled resource block to the highest. The corresponding subcarriers in this set of resource blocks are numbered in increasing order starting from the lowest frequency from 0 to $N_{sc}^{RB}N_{RB} - 1$. The subcarriers to which the PT-RS shall be mapped are given by $$k = k_{ref}^{RE} + (iK_{PT-RS} + k_{ref}^{RB})N_{sc}^{RB}$$

$$k_{ref}^{RB} = \begin{cases} N_{ID} \bmod K_{PT-RS} & \text{if } N_{RB} \bmod K_{PT-RS} = 0 \\ N_{ID} \bmod (N_{RB} \bmod K_{PT-RS}) & \text{otherwise} \end{cases}$$

where
    i = 0, 1, 2, ...
    $k_{ref}^{RE}$ is given by Table 10B for the DM-RS port associated with the PT-RS port according to clause 8.2.4 in 3GPP TS 38.214 V16.2.0.
    $N_{RB}$ is the number of resource blocks scheduled;
    $K_{PT-RS} \in \{2, 4\}$ is given by 3GPP TS 38.214 V16.2.0;

TABLE 10A-continued 8.4.1.2.2 Mapping to physical resources $N_{ID} = N_{ID}^X \bmod 2^{16}$ where the quantity $N_{ID}^X$ equals the decimal representation of CRC on the PSCCH associated with the PSSCH according to $N_{ID}^X = \Sigma_{i=0}^{L-1} p_i \cdot 2^{L-1-i}$ with p and L given by clause 7.3.2 in 3GPP TS 38.212 V16.2.0.
PSSCH PT-RS shall not be mapped to resource elements containing PSCCH or PSCCH DMRS by puncturing PSSCH PT-RS.
A UE is not expected to receive sidelink CSI-RS and PSSCH PT-RS on the same resource elements.

TABLE 10B

The parameter $k_{ref}^{RE}$.

| DM-RS antenna port $\tilde{p}$ | $k_{ref}^{RE}$ resourceElementOffset | | | |
|---|---|---|---|---|
| | offset00 | offset01 | offset10 | offset11 |
| 0 | 0 | 2 | 6 | 8 |
| 1 | 2 | 4 | 8 | 10 |

Based on an embodiment of the present disclosure, the transmitting UE may perform PT-RS mapping (differently) based on at least one of (i) the number of RBs or subchannels allocated or scheduled for PSSCH transmission, (ii) a bandwidth allocated or scheduled for PSCCH transmission and/or (iii) MCS information (e.g., an MCS index or an MCS value).

For example, the transmitting UE may determine the density of the PT-RS on the time domain based on a scheduled MCS and a threshold, and the transmitting UE may map the PT-RS onto a resource based on the determined density on the time domain. For example, the transmitting UE may receive information related to the threshold from the base station/network. For example, the threshold may be pre-defined for the UE. For example, a time domain interval/density of the PT-RS when MCS information is less than or equal to a specific threshold may be different from a time domain interval/density of the PT-RS when MCS information is greater than or equal to a specific threshold. This is just an example, and a PT-RS mapping method (e.g., time domain interval/density, etc.) may be different according to a plurality of MCS ranges. For example, the transmitting UE may determine the density of the PT-RS on the frequency domain based on a bandwidth allocated or scheduled for PSSCH and/or PSCCH transmission, and the transmitting UE may map the PT-RS onto a resource based on the determined density on the frequency domain.

In step S1210, the transmitting UE may transmit the reference signal.

Meanwhile, in sidelink communication, a plurality of MCS tables may be (pre-)configured to the UE for a resource pool, and the UE may select one of the configured MCS tables and indicate it through SCI. For example, the UE may transmit SCI including information related to the selected MCS table. In the above case, it is necessary to have different sets of MCS threshold values for appropriate PT-RS mapping for each selected MCS table. More specifically, MCS may include modulation order information and coding rate information, and a combination of (i) modulation order and (ii) coding rate corresponding to the same MCS index may be different from each other according to the MCS table. For example, if it is assumed that the UE does not perform PT-RS mapping for QPSK modulation, an MCS threshold for PT-RS mapping needs to be different for each MCS table.

For example, a set of MCS thresholds for PT-RS mapping and/or a set of thresholds for the number of scheduled PRBs may be (pre-)configured for each MCS table to the UE. For example, the base station/network may transmit information related to a set of MCS thresholds for PT-RS mapping and/or information related to a set of thresholds for the number of scheduled PRBs for each MCS table to the UE. For example, if the base station configures a set of MCS thresholds for PT-RS mapping and/or a set of thresholds for the number of scheduled PRBs to the UE, the base station may additionally configure an MCS table corresponding to an MCS threshold for PT-RS mapping and/or an MCS table corresponding to a threshold for the number of scheduled PRBs to the UE. For example, the transmitting UE may select an MCS table, and the transmitting UE may determine a PT-RS mapping method based on a threshold corresponding to the MCS table. For example, the receiving UE may receive SCI including information related to an MCS table from the transmitting UE, and the receiving UE may determine a PT-RS mapping method based on a threshold corresponding to the MCS table.

For example, when the UE applies a set of MCS threshold values for PT-RS mapping, the UE may refer to a specific MCS table. That is, an MCS table (actually) used by the UE and a reference MCS table (virtually) referenced by the UE for PT-RS mapping may be configured differently. For example, the UE may interpret/determine an MCS threshold based on the reference MCS table, and the UE may determine a PT-RS mapping method by converting an (actually) used MCS table and/or an MCS index value into an MCS index for the reference MCS table for PT-RS mapping. For example, the UE may calculate a spectral efficiency value corresponding to an MCS threshold based on the reference MCS table (e.g., product of a modulation order and a coding rate), and the UE may calculate a spectral efficiency value from an MCS table and an MCS index value to be actually used in the same way. For example, the UE may determine a PT-RS mapping method (e.g., time domain interval) according to an MCS range to which a spectral efficiency value estimated from a value indicated by SCI belongs. For example, the UE may convert an MCS table value and an MCS index value indicated by SCI into an MCS index of the reference MCS table. For example, an MCS index indicated by SCI may be converted into an MCS index corresponding to a coding rate identical to a coding rate indicated by the SCI among MCS index(es) corresponding to the same modulation order in the reference MCS table. For example, an MCS index indicated by SCI may be converted into an MCS index corresponding to the largest coding rate among coding rates less than or equal to a coding rate indicated by the SCI among MCS indexes corresponding to the same modulation order in the reference MCS table. For example, an MCS index indicated by SCI may be converted into an MCS index corresponding to the smallest coding rate among coding rates greater than or equal to a coding rate indicated by the SCI among MCS indexes corresponding to the same modulation order in the reference MCS table. In the above-described embodiment, if there is no MCS index corresponding to the same modulation order in the reference MCS table, an MCS index indicated by SCI may be converted into the lowest MCS index among MCS indexes corresponding to the next higher modulation order or the next MCS index having another modulation order in the reference MCS table. For example, in another method, an MCS threshold for PT-RS mapping may be converted according to an MCS table indicated by SCI.

Table 11 shows an example of an MCS table related to 64QAM. For convenience of description, the MCS table related to 64QAM may be referred to as a 64QAM MCS table. Table 11 is an example of a 64QAM MCS table, which can be modified in various forms.

TABLE 11

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.206 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Table 12 shows an example of an MCS table related to 256QAM. For convenience of description, the MCS table related to 256QAM may be referred to as a 256QAM MCS table. Table 12 is an example of a 256QAM MCS table, which can be modified in various forms.

TABLE 12

| MCS Index $I_{MCS}$ | Modulation Order $Q_m$ | Target code Rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.206 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |

TABLE 12-continued

| MCS Index $I_{MCS}$ | Modulation Order $Q_m$ | Target code Rate R x [1024] | Spectral efficiency |
|---|---|---|---|
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | | reserved |
| 29 | 4 | | reserved |
| 30 | 6 | | reserved |
| 31 | 8 | | reserved |

Table 13 shows an example of an MCS table related to 64 QAM Low Spectral Efficiency (SE). For convenience of description, the MCS table related to 64 QAM Low SE may be referred to as a 64QAM Low SE MCS table. Table 13 is an example of a 64QAM Low SE MCS table, which can be modified in various forms.

TABLE 13

| MCS Index $I_{MCS}$ | Modulation Order $Q_m$ | Target code Rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.206 |
| 27 | 6 | 719 | 4.2129 |
| 28 | 6 | 772 | 4.5234 |
| 29 | 2 | | reserved |
| 30 | 4 | | reserved |
| 31 | 6 | | reserved |

For example, the reference MCS table for PT-RS mapping may be the general 64QAM MCS table. This is because the 64QAM MCS table may always exist as a default in sidelink. For example, the reference MCS table for PT-RS mapping may be the 256QAM table. For example, the reference MCS table for PT-RS mapping may be a table having the largest spectral efficiency value among MCS tables configured for a corresponding resource pool. This is because a spectral efficiency value corresponding to an MCS threshold needs to be sufficiently high in a situation where the PT-RS may be required in a high modulation order.

For example, the UE may (differently) determine whether to map the PT-RS according to an MCS table indicated by SCI. More specifically, if an MCS table indicated by SCI is the MCS table corresponding to URLLC or the 64QAM Low SE MCS table, PT-RS mapping may not be allowed for the UE. In this case, the UE may not perform PT-RS mapping.

Based on an embodiment of the present disclosure, up to four MCS thresholds for determining a PT-RS mapping method may be configured to the UE. For example, the base station may transmit information related to up to four MCS thresholds to the UE. For example, based on the four thresholds, an MCS range may be divided into four. For example, a first range may be a case in which an MCS index is less than a first threshold, and a second range may be a case in which an MCS index is greater than or equal to the first threshold and less than a second threshold, and a third range may be a case in which an MCS index is greater than or equal to the second threshold and less than a third threshold, and a fourth range may be a case in which an MCS index is greater than or equal to the third threshold and less than a fourth threshold. Basically, if an MCS index corresponds to a reserved state or if there is no coding rate information corresponding to an MCS index, the UE may not use the MCS indicated by SCI to determine a PT-RS mapping method. Also, in the case of sidelink, the UE may not use the MCS index.

For example, in the case of the first threshold and/or the second threshold and/or the third threshold, a range of the threshold may be determined according to an MCS table configured for a resource pool. For example, if the 256QAM table is configured for the resource pool, the range of thresholds may be from 0 to 28. For example, if the 256QAM table is not configured for the resource pool, the range of thresholds may be from 0 to 29. Herein, the UE may not expect a threshold to be set outside the range of thresholds. For example, the UE may determine/consider that no threshold is set outside the range of thresholds.

For example, in the case of the first threshold and/or the second threshold and/or the third threshold, the value may be changed according to an MCS table configured for a resource pool. For example, if an MCS table indicated by SCI is the 256QAM table, the UE may interpret/determine the corresponding value as 28 even if the threshold is 29.

For example, if the fourth threshold is not configured for the UE, the UE may interpret/determine the threshold differently according to an MCS table indicated by SCI. For example, if the (general) 64QAM table is indicated by SCI, the fourth threshold value may be 29. For example, if the 256QAM table is indicated by SCI, the fourth threshold value may be 28. For example, if the 64QAM Low SE MCS table is indicated by SCI, the fourth threshold value may be 29. For example, if the UE determines a sidelink PT-RS mapping method, the fourth range may be changed to a case in which an MCS index is greater than or equal to the third threshold. In this case, the fourth threshold may be omitted.

For example, for a plurality of MCS tables configured for a resource pool for which the threshold is configured, the UE may not expect that MCS belonging to the first range has a modulation order other than QPSK. For example, for a plurality of MCS tables configured for a resource pool for which the threshold is configured, the UE may determine/consider that MCS belonging to the first range does not have a modulation order other than QPSK. For example, if the 256 QAM table is configured for a resource pool, the UE may not expect that the first threshold is greater than or equal to 5. For example, if the 256 QAM table is configured for a resource pool, the UE may determine/consider that the first threshold is less than or equal to 4. This is because demodulation performance may significantly deteriorate if there is no PT-RS at a relatively high modulation order.

Although the operation in the sidelink has been described in the embodiments described herein for convenience of description, it can be extended and applied to a PT-RS transmitted from the base station to the UE and/or a PT-RS transmitted from the UE to the base station.

Figure 13:
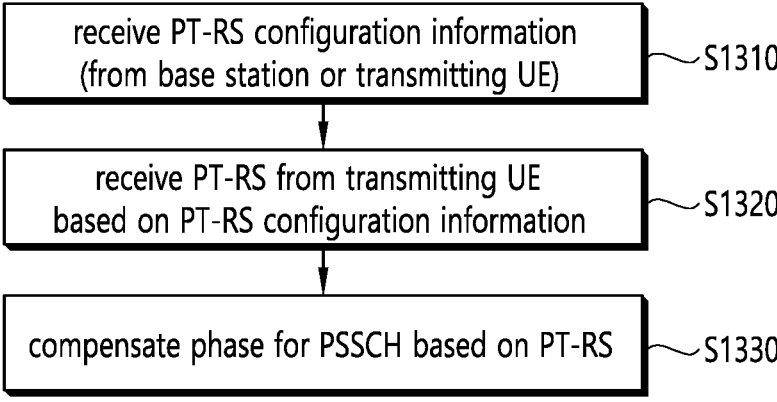
FIG. 13 shows a method for a receiving UE to receive a PT-RS, based on an embodiment of the present disclosure.

FIG. 13 shows a method for a receiving UE to receive a PT-RS, based on an embodiment of the present disclosure. The embodiment of FIG. 13 may be combined with various embodiments of the present disclosure.

Referring to FIG. 13, in step S1310, the receiving UE may receive PT-RS configuration information (from the base station or the transmitting UE). In step S1320, the receiving UE may receive a PT-RS from the transmitting UE based on the PT-RS configuration information. In step S1330, the receiving UE may compensate the phase for a PSSCH based on the PT-RS. For example, the PT-RS configuration information may include a parameter related to a density on a frequency domain of time-frequency resources through which the PT-RS is transmitted, and a parameter related to a density on a time domain of time-frequency resources through which the PT-RS is transmitted, a parameter related to an epre-ratio between the PT-RS and a sidelink channel, a parameter related to a resource offset, etc.

Figure 14:
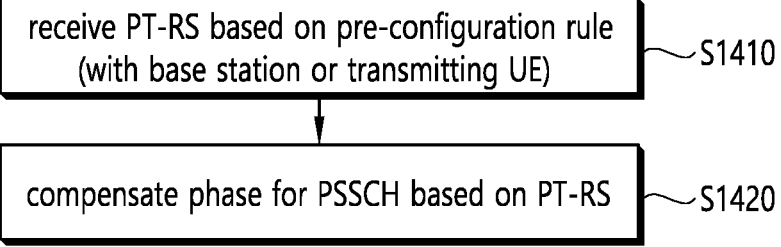
FIG. 14 shows a method for a receiving UE to receive a PT-RS, based on an embodiment of the present disclosure.

FIG. 14 shows a method for a receiving UE to receive a PT-RS, based on an embodiment of the present disclosure. The embodiment of FIG. 14 may be combined with various embodiments of the present disclosure.

Referring to FIG. 14, in step S1410, the receiving UE may receive a PT-RS based on a pre-configuration rule (with the base station or the transmitting UE). In step S1420, the receiving UE may compensate the phase for a PSSCH based on the PT-RS.

Figure 15:
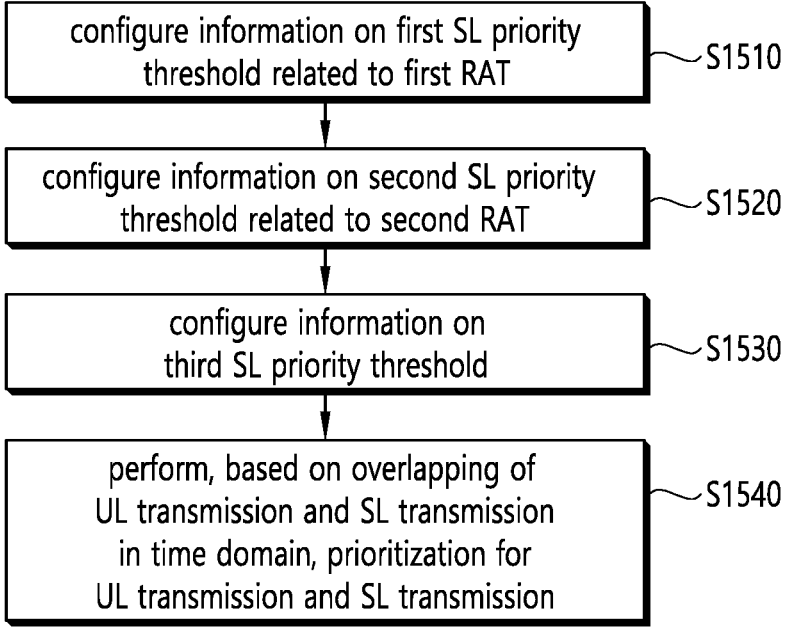
FIG. 15 shows a method for a first device to perform wireless communication, based on an embodiment of the present disclosure.

FIG. 15 shows a method for a first device to perform wireless communication, based on an embodiment of the present disclosure. The embodiment of FIG. 15 may be combined with various embodiments of the present disclosure.

Referring to FIG. 15, in step S1510, the first device may configure information on a first sidelink (SL) priority threshold related to a first radio access technology (RAT). In step S1520, the first device may configure information on a second SL priority threshold related to a second RAT. In step S1530, the first device may configure information on a third SL priority threshold. In step S1540, the first device may perform, based on overlapping of uplink (UL) transmission and SL transmission in a time domain, prioritization for the UL transmission and the SL transmission. For example, based on different RATs between the UL transmission and the SL transmission, the prioritization for the UL transmission and the SL transmission may be performed based on the third SL priority threshold.

For example, the third SL priority threshold may be an SL priority threshold for prioritizing UL transmission and SL transmission based on different RATs. For example, the third SL priority threshold may be configured based on a combination of RATs.

For example, at least one of the information on the first SL priority threshold, the information on the second SL priority threshold, or the information on the third SL priority threshold may be received from a base station. For example, at least one of the information on the first SL priority threshold, the information on the second SL priority threshold, or the information on the third SL priority threshold may be pre-configured for the first device.

For example, the third SL priority threshold may include at least one of a fourth SL priority threshold for prioritizing UL transmission based on the first RAT and SL transmission based on the second RAT or a fifth SL priority threshold for prioritizing SL transmission based on the first RAT and UL transmission based on the second RAT.

For example, the first RAT may be long term evolution (LTE), and the second RAT may be NR.

For example, based on that a priority value related to the SL transmission based on the second RAT is less than the third SL priority threshold, a priority of the SL transmission based on the second RAT may be higher than a priority of the UL transmission based on the first RAT.

For example, the information on the second SL priority threshold may include information on an ultra reliable low latency communication (URLLC)-related SL priority threshold. For example, based on that (i) the UL transmission based on the second RAT is related to URLLC and (ii) a priority value related to the SL transmission based on the first RAT is less than the URLLC-related SL priority threshold, a priority of the SL transmission may be higher than a priority of the UL transmission. For example, based on that (i) the UL transmission based on the second RAT is not related to URLLC and (ii) a priority value related to the SL transmission based on the first RAT is less than the third SL priority threshold, a priority of the SL transmission may be higher than a priority of the UL transmission. For example, based on that (i) the UL transmission based on the second RAT is not related to URLLC and (ii) a priority value related to the SL transmission based on the first RAT is greater than or equal to the third SL priority threshold, the priority of the UL transmission may be higher than the priority of the SL transmission.

For example, based on the UL transmission based on the first RAT and the SL transmission based on the first RAT, the prioritization for the UL transmission and the SL transmission may be performed based on the first SL priority threshold.

For example, based on the UL transmission based on the second RAT and the SL transmission based on the second RAT, the prioritization for the UL transmission and the SL transmission may be performed based on the second SL priority threshold.

The proposed method can be applied to the device(s) based on various embodiments of the present disclosure. First, the processor 102 of the first device 100 may configure information on a first sidelink (SL) priority threshold related to a first radio access technology (RAT). In addition, the processor 102 of the first device 100 may configure information on a second SL priority threshold related to a second RAT. In addition, the processor 102 of the first device 100 may configure information on a third SL priority threshold. In addition, the processor 102 of the first device 100 may perform, based on overlapping of uplink (UL) transmission and SL transmission in a time domain, prioritization for the UL transmission and the SL transmission. For example, based on different RATs between the UL transmission and the SL transmission, the prioritization for the UL transmission and the SL transmission may be performed based on the third SL priority threshold.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: configure information on a first sidelink (SL) priority threshold related to a first radio access technology (RAT); configure information on a second SL priority threshold related to a second RAT; configure information on a third SL priority threshold; and perform, based on overlapping of uplink (UL) transmission and SL transmission in a time domain, prioritization for the UL transmission and the SL transmission. For example, based on different RATs between the UL transmission and the SL transmission, the prioritization for the UL transmission and the SL transmission may be performed based on the third SL priority threshold.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: configure information on a first sidelink (SL) priority threshold related to a first radio access technology (RAT); configure information on a second SL priority threshold related to a second RAT; configure information on a third SL priority threshold; and perform, based on overlapping of uplink (UL) transmission and SL transmission in a time domain, prioritization for the UL transmission and the SL transmission. For example, based on different RATs between the UL transmission and the SL transmission, the prioritization for the UL transmission and the SL transmission may be performed based on the third SL priority threshold.

Based on an embodiment of the present disclosure, a non-transitory computer-readable storage medium storing instructions may be provided. For example, the instructions, when executed, may cause a first device to: configure information on a first sidelink (SL) priority threshold related to a first radio access technology (RAT); configure information on a second SL priority threshold related to a second RAT; configure information on a third SL priority threshold; and perform, based on overlapping of uplink (UL) transmission and SL transmission in a time domain, prioritization for the UL transmission and the SL transmission. For example, based on different RATs between the UL transmission and the SL transmission, the prioritization for the UL transmission and the SL transmission may be performed based on the third SL priority threshold.

Figure 16:
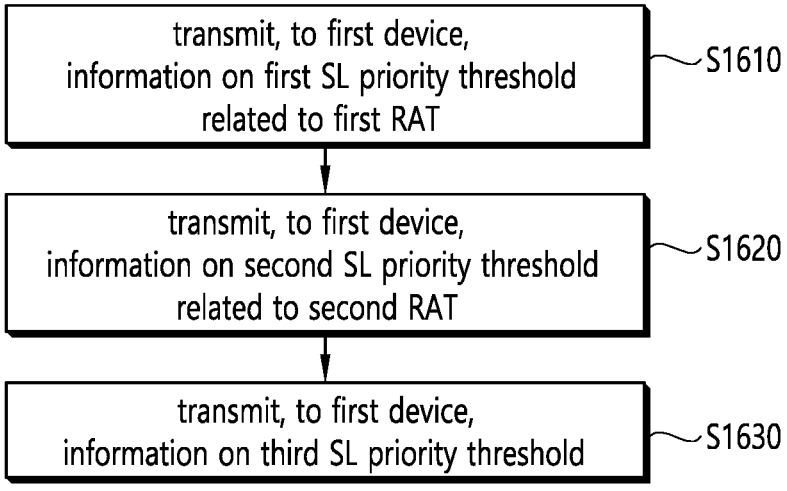
FIG. 16 shows a method for a base station to perform wireless communication, based on an embodiment of the present disclosure.

FIG. 16 shows a method for a base station to perform wireless communication, based on an embodiment of the present disclosure. The embodiment of FIG. 16 may be combined with various embodiments of the present disclosure.

Referring to FIG. 16, in step S1610, the base station may transmit, to a first device, information on a first sidelink (SL) priority threshold related to a first radio access technology (RAT). In step S1620, the base station may transmit, to the first device, information on a second SL priority threshold related to a second RAT. In step S1630, the base station may transmit, to the first device, information on a third SL priority threshold. For example, based on that uplink (UL) transmission of the first device and SL transmission of the first device overlap in a time domain, and that RATs between the UL transmission and the SL transmission are different, prioritization for the UL transmission and the SL transmission may be performed based on the third SL priority threshold.

The proposed method can be applied to the device(s) based on various embodiments of the present disclosure. First, the processor 202 of the base station 200 may control the transceiver 206 to transmit, to a first device, information on a first sidelink (SL) priority threshold related to a first radio access technology (RAT). In addition, the processor 202 of the base station 200 may control the transceiver 206 to transmit, to the first device, information on a second SL priority threshold related to a second RAT. In addition, the processor 202 of the base station 200 may control the transceiver 206 to transmit, to the first device, information on a third SL priority threshold. For example, based on that uplink (UL) transmission of the first device and SL transmission of the first device overlap in a time domain, and that RATs between the UL transmission and the SL transmission are different, prioritization for the UL transmission and the SL transmission may be performed based on the third SL priority threshold.

Based on an embodiment of the present disclosure, a base station adapted to perform wireless communication may be provided. For example, the base station may comprise: one or more memories storing instructions; one or more transceivers; and one or more processors connected to the one or more memories and the one or more transceivers. For example, the one or more processors may execute the instructions to: transmit, to a first device, information on a first sidelink (SL) priority threshold related to a first radio access technology (RAT); transmit, to the first device, information on a second SL priority threshold related to a second RAT; and transmit, to the first device, information on a third SL priority threshold. For example, based on that uplink (UL) transmission of the first device and SL transmission of the first device overlap in a time domain, and that RATs between the UL transmission and the SL transmission are different, prioritization for the UL transmission and the SL transmission may be performed based on the third SL priority threshold.

Based on an embodiment of the present disclosure, an apparatus adapted to control a base station may be provided. For example, the apparatus may comprise: one or more processors; and one or more memories operably connected to the one or more processors and storing instructions. For example, the one or more processors may execute the instructions to: transmit, to a first user equipment (UE), information on a first sidelink (SL) priority threshold related to a first radio access technology (RAT); transmit, to the first UE, information on a second SL priority threshold related to a second RAT; and transmit, to the first UE, information on a third SL priority threshold. For example, based on that uplink (UL) transmission of the first UE and SL transmission of the first UE overlap in a time domain, and that RATs between the UL transmission and the SL transmission are different, prioritization for the UL transmission and the SL transmission may be performed based on the third SL priority threshold.

Based on an embodiment of the present disclosure, a non-transitory computer-readable storage medium storing instructions may be provided. For example, the instructions, when executed, may cause a base station to: transmit, to a first device, information on a first sidelink (SL) priority threshold related to a first radio access technology (RAT); transmit, to the first device, information on a second SL priority threshold related to a second RAT; and transmit, to the first device, information on a third SL priority threshold. For example, based on that uplink (UL) transmission of the first device and SL transmission of the first device overlap in a time domain, and that RATs between the UL transmission and the SL transmission are different, prioritization for the UL transmission and the SL transmission may be performed based on the third SL priority threshold.

Based on various embodiments of the present disclosure, when the UE performs NR SL communication and LTE Uu communication on an LTE carrier or an NR carrier, prioritization rules for NR SL communication and LTE Uu communication may be defined. In addition, when the UE performs LTE SL communication and NR Uu communication on an NR carrier or an LTE carrier, prioritization rules for LTE SL communication and NR Uu communication may be defined. Through this, it is possible to efficiently manage/perform Uu communication and SL communication performed in different RATs.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 17:
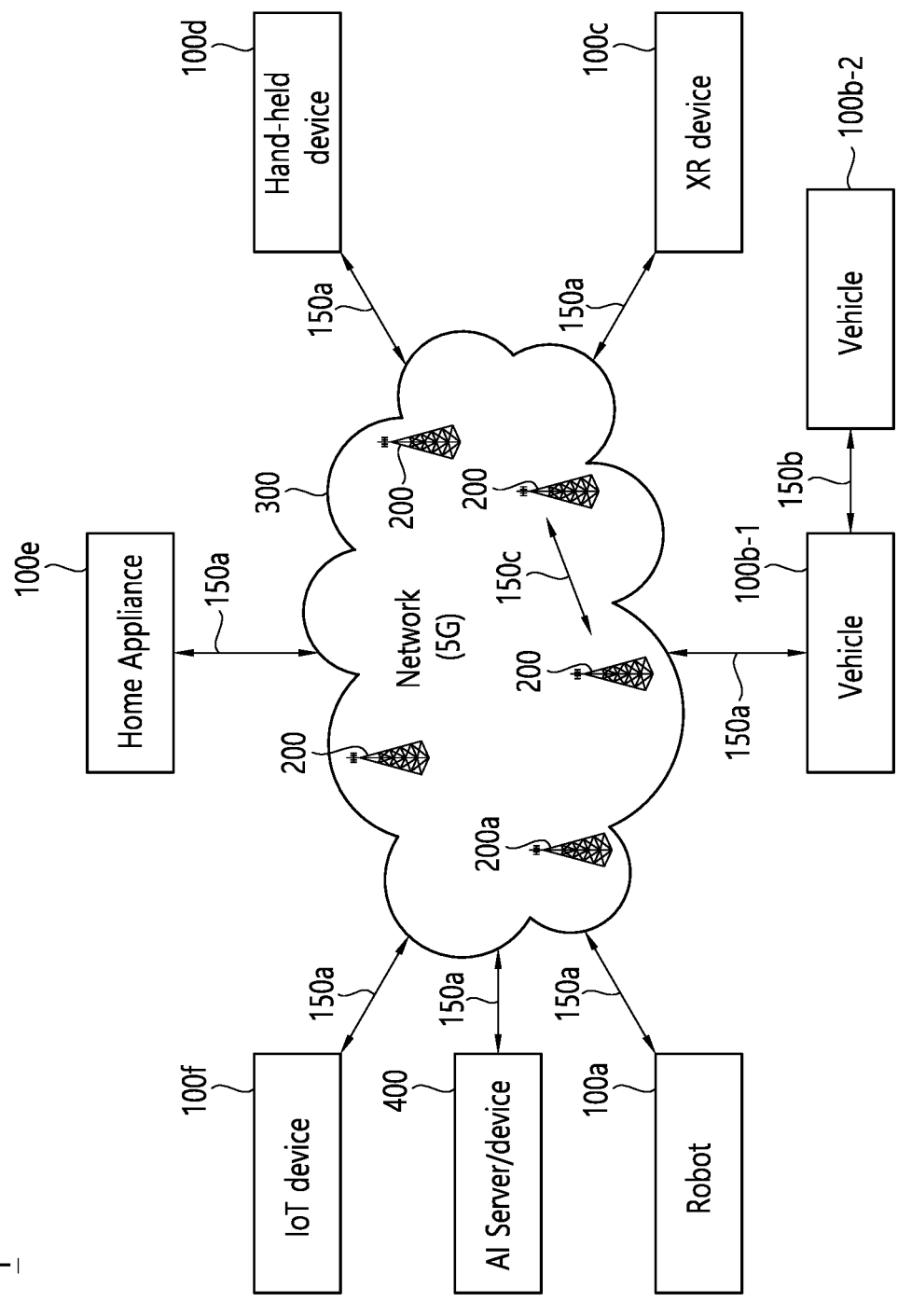
FIG. 17 shows a communication system 1, based on an embodiment of the present disclosure.

FIG. 17 shows a communication system 1, based on an embodiment of the present disclosure.

Referring to FIG. 17, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 18:
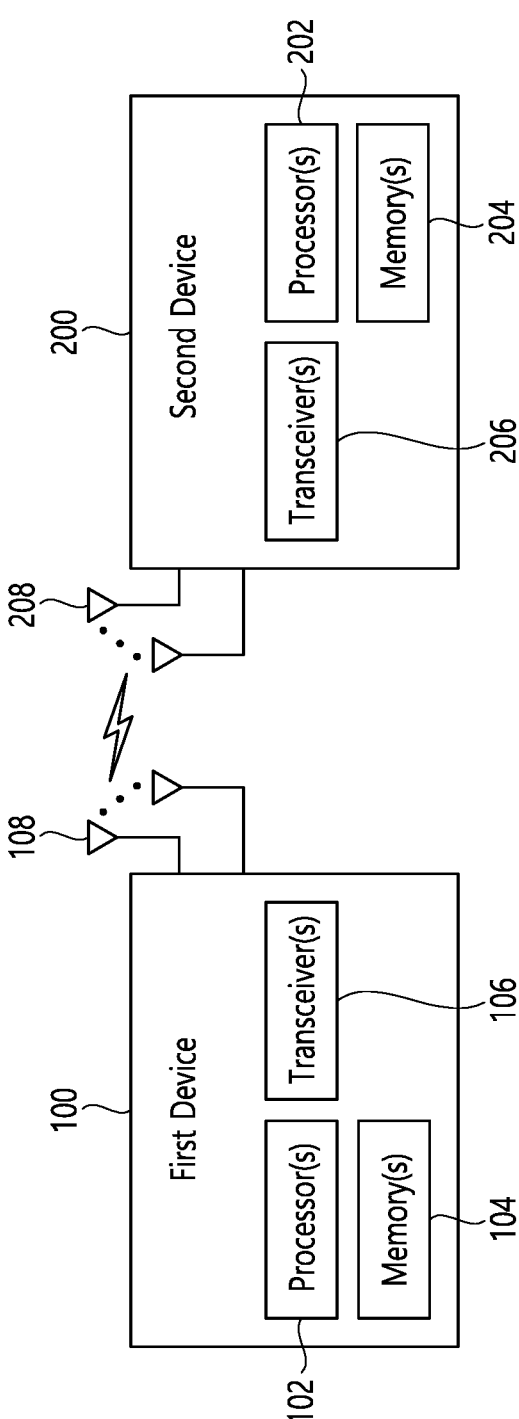
FIG. 18 shows wireless devices, based on an embodiment of the present disclosure.

FIG. 18 shows wireless devices, based on an embodiment of the present disclosure.

Referring to FIG. 18, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 17.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 19:
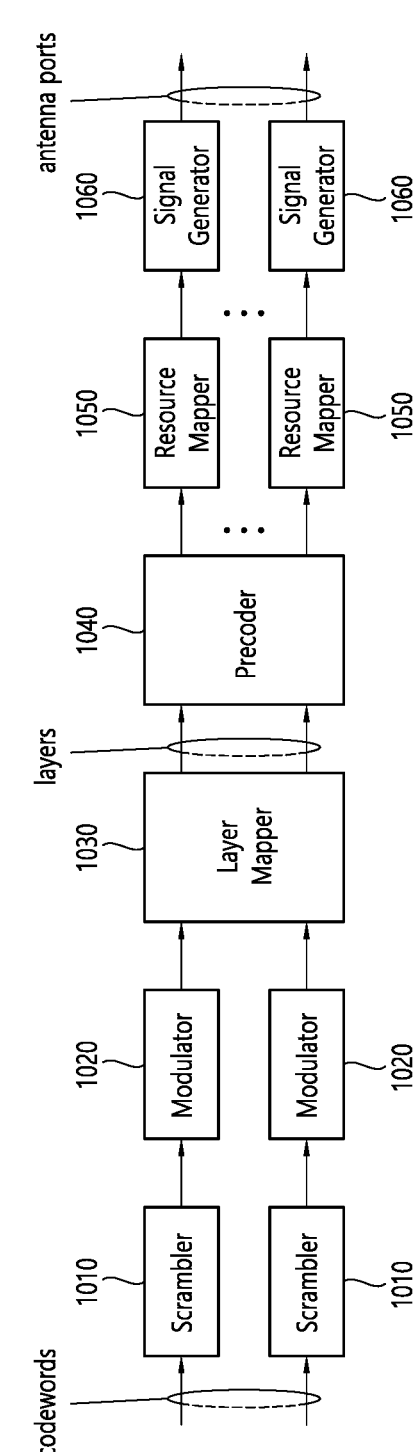
FIG. 19 shows a signal process circuit for a transmission signal, based on an embodiment of the present disclosure.

FIG. 19 shows a signal process circuit for a transmission signal, based on an embodiment of the present disclosure.

Referring to FIG. 19, a signal processing circuit 1000 may include scramblers 1010, modulators 1020, a layer mapper 1030, a precoder 1040, resource mappers 1050, and signal generators 1060. An operation/function of FIG. 19 may be performed, without being limited to, the processors 102 and 202 and/or the transceivers 106 and 206 of FIG. 18. Hardware elements of FIG. 19 may be implemented by the processors 102 and 202 and/or the transceivers 106 and 206 of FIG. 18. For example, blocks 1010 to 1060 may be implemented by the processors 102 and 202 of FIG. 18. Alternatively, the blocks 1010 to 1050 may be implemented by the processors 102 and 202 of FIG. 18 and the block 1060 may be implemented by the transceivers 106 and 206 of FIG. 18.

Codewords may be converted into radio signals via the signal processing circuit 1000 of FIG. 19. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 19. For example, the wireless devices (e.g., 100 and 200 of FIG. 18) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 20 shows another example of a wireless device, based on an embodiment of the present disclosure. The wireless device may be implemented in various forms according to a use-case/service (refer to FIG. 17).

Referring to FIG. 20, wireless devices 100 and 200 may correspond to the wireless devices 100 and 200 of FIG. 18 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 18. For example, the transceiver(s) 114 may include the one or more transceivers 106 and 206 and/or the one or more antennas 108 and 208 of FIG. 18. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 17), the vehicles (100*b*-1 and 100*b*-2 of FIG. 17), the XR device (100*c* of FIG. 17), the hand-held device (100*d* of FIG. 17), the home appliance (100*e* of FIG. 17), the IoT device (100*f* of FIG. 17), a digital broadcast terminal, a hologram device, a public safety device, an MTC device, a medicine device, a fintech device (or a finance device), a security device, a climate/environment device, the AI server/device (400 of FIG. 17), the BSs (200 of FIG. 17), a network node, etc. The wireless device may be used in a mobile or fixed place according to a use-example/service.

In FIG. 20, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 20 will be described in detail with reference to the drawings.

Figure 21:
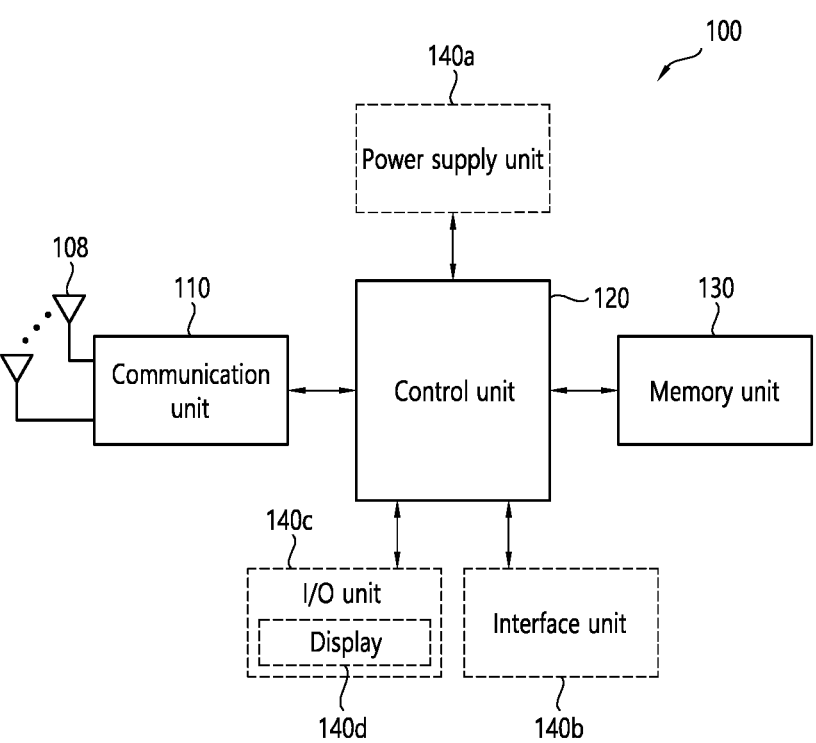
FIG. 21 shows a hand-held device, based on an embodiment of the present disclosure.

FIG. 21 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 21, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit

110. Blocks 110 to 130/140*a* to 140*c* correspond to the blocks 110 to 130/140 of FIG. 20, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 22 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 22, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method, comprising:
obtaining, by a first device, information for a first priority threshold which is used for prioritization between transmissions using a first radio access technology (RAT);
obtaining, by the first device, information for a second priority threshold which is used for prioritization between transmissions using a second RAT;
obtaining, by the first device, information for a third priority threshold which is used for prioritization between transmissions using different RATs; and
performing, by the first device, based on overlapping of uplink transmission and sidelink transmission in a time domain, prioritization between the uplink transmission and the sidelink transmission,
wherein, based on that the different RATs are used for the uplink transmission and the sidelink transmission, the prioritization between the uplink transmission and the sidelink transmission is performed based on the information for the third priority threshold.

2. The method of claim 1, wherein the information for the third priority threshold is configured based on a combination of the different RATs.

3. The method of claim 1, wherein at least one of the information for the first priority threshold, the information for the second priority threshold, or the information for the third priority threshold is received from a base station.

4. The method of claim 1, wherein at least one of the information for the first priority threshold, the information for the second priority threshold, or the information for the third priority threshold is pre-configured for the first device.

5. The method of claim 1, wherein the information for the third priority threshold includes information for a priority threshold for prioritization between first RAT-based uplink transmission and second RAT-based sidelink transmission and information for a priority threshold for prioritization between first RAT-based sidelink transmission and second RAT-based uplink transmission.

6. The method of claim 1, wherein the different RATs include the first RAT which is long term evolution (LTE), and the second RAT which is new radio (NR).

7. The method of claim 1, wherein, based on that a priority value related to second RAT-based sidelink transmission is less than the information for the third priority threshold, a priority of the second RAT-based sidelink transmission is higher than a priority of first RAT-based uplink transmission.

8. The method of claim 1, wherein the information for the second priority threshold includes information for an ultra reliable low latency communication (URLLC)-related priority threshold.

9. The method of claim 8, wherein, based on that (i) second RAT-based uplink transmission is related to URLLC and (ii) a priority value related to first RAT-based sidelink transmission is less than the information for the URLLC-related priority threshold, a priority of the first RAT-based sidelink transmission is higher than a priority of the second RAT-based uplink transmission.

10. The method of claim 8, wherein, based on that (i) second RAT-based uplink transmission is not related to URLLC and (ii) a priority value related to first RAT-based sidelink transmission is less than the information for the third priority threshold, a priority of the first RAT-based sidelink transmission is higher than a priority of the second RAT-based uplink transmission, and
wherein, based on that (i) the second RAT-based uplink transmission is not related to URLLC and (ii) the priority value related to the first RAT-based sidelink transmission is greater than or equal to the information for the third priority threshold, the priority of the second RAT-based uplink transmission is higher than the priority of the first RAT-based sidelink transmission.

11. The method of claim 1, wherein, based on that the first RAT is used for the UL transmission and the SL transmission, the prioritization between the UL transmission and the SL transmission is performed based on the information for the first priority threshold.

12. The method of claim 1, wherein, based on that the second RAT is used for the UL transmission and the SL transmission, the prioritization for the UL transmission and the SL transmission is performed based on the information for the second priority threshold.

13. A first device, comprising:
at least one transceiver;
at least one processor; and
at least one memory connected to the at least one processor and storing instructions that, based on being executed by the at least one processor, cause the first device to perform operations comprising:

obtaining information for a first priority threshold which is used for prioritization between transmissions using a first radio access technology (RAT);

obtaining information for a second priority threshold which is used for prioritization between transmissions using a second RAT;

obtaining information for a third priority threshold which is used for prioritization between transmissions using different RATs; and performing, based on overlapping of uplink transmission and sidelink transmission in a time domain, prioritization between the uplink transmission and the sidelink transmission, wherein, based on that the different RATs are used for the uplink transmission and the sidelink transmission, the prioritization between the uplink transmission and the sidelink transmission is performed based on the information for the third priority threshold.

14. A processing device, comprising:

at least one processor; and at least one memory connected to the at least one processor and storing instructions that, based on being executed by the at least one processor, cause a first device to perform operations comprising:

obtaining information for a first priority threshold which is used for prioritization between transmissions using a first radio access technology (RAT);

obtaining information for a second priority threshold which is used for prioritization between transmissions using a second RAT;

obtaining information for a third priority threshold which is used for prioritization between transmissions using different RATs; and performing, based on overlapping of uplink (UL) transmission and sidelink transmission in a time domain, prioritization between the uplink transmission and the sidelink transmission, wherein, based on that the different RATs are used for the uplink transmission and the sidelink transmission, the prioritization between the uplink transmission and the sidelink transmission is performed based on the information for the third priority threshold.

15. The processing device of claim 14, wherein the information for the third priority threshold is configured based on a combination of the different RATs.

16. The processing device of claim 14, wherein at least one of the information for the first priority threshold, the information for the second priority threshold, or the information for the third priority threshold is received from a base station.

17. The processing device of claim 14, wherein at least one of the information for the first priority threshold, the information for the second priority threshold, or the information for the third priority threshold is pre-configured for the first device.

18. The processing device of claim 14, wherein the information for the third priority threshold includes information for a priority threshold for prioritization between first RAT-based uplink transmission and second RAT-based sidelink transmission and information for a priority threshold for prioritization between first RAT-based sidelink transmission and second RAT-based uplink transmission.

*     *     *     *     *